(12) United States Patent
Yada et al.

(10) Patent No.: US 6,941,505 B2
(45) Date of Patent: Sep. 6, 2005

(54) DATA PROCESSING SYSTEM AND DATA PROCESSING METHOD

(75) Inventors: Naoki Yada, Sayama (JP); Eiichi Ishikawa, Higashimurayama (JP); Mitsuru Hiraki, Kodaira (JP); Shoji Shukuri, Koganei (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 09/938,629

(22) Filed: Aug. 27, 2001

(65) Prior Publication Data

US 2002/0032891 A1 Mar. 14, 2002

(30) Foreign Application Priority Data

Sep. 12, 2000 (JP) ........................................ 2000-275983
Jun. 22, 2001 (JP) ........................................ 2001-189276

(51) Int. Cl.[7] ............................................. G11C 29/00
(52) U.S. Cl. ................... 714/763; 714/752; 714/52; 714/54; 714/42
(58) Field of Search ..................... 714/763, 772, 714/720, 48, 756, 752, 746, 52, 54, 42, 25, 8, 773; 365/195, 185.19, 185.04; 711/163

(56) References Cited

U.S. PATENT DOCUMENTS

| | | | | |
|---|---|---|---|---|
| 4,677,622 A | * | 6/1987 | Okamoto et al. | 714/756 |
| 4,726,021 A | * | 2/1988 | Horiguchi et al. | 714/773 |
| 4,780,809 A | * | 10/1988 | Woffinden et al. | 714/48 |
| 5,097,445 A | * | 3/1992 | Yamauchi | 365/195 |
| 5,428,630 A | * | 6/1995 | Weng et al. | 714/763 |
| 5,450,424 A | * | 9/1995 | Okugaki et al. | 714/772 |
| 5,991,202 A | * | 11/1999 | Derhacobian et al. | 365/185.19 |
| 6,000,021 A | * | 12/1999 | Saito et al. | 711/163 |
| 6,198,657 B1 | * | 3/2001 | Uekubo et al. | 365/185.04 |
| 6,219,807 B1 | * | 4/2001 | Ebihara et al. | 714/720 |
| 6,546,517 B1 | * | 4/2003 | Yoshimura | 714/763 |

FOREIGN PATENT DOCUMENTS

| | | | | |
|---|---|---|---|---|
| JP | 3-057048 | | 3/1991 | |
| JP | 05046494 A | * | 2/1993 | ........... G06F/12/16 |
| JP | 7-210215 | | 8/1995 | |
| JP | 11219299 A | * | 8/1999 | ........... G06F/9/445 |
| JP | 11-296392 | | 10/1999 | |

OTHER PUBLICATIONS

Ikehashi et al., "A 60ns Access 32kByte 3–Transistor Flash for Low Power Embedded Applications," 2000 Symposium on VLSI Circuits Digest of Technical Papers, pp 162–165.

* cited by examiner

Primary Examiner—Albert Decady
Assistant Examiner—Dipakkumar Gandhi
(74) Attorney, Agent, or Firm—Miles & Stockbridge P.C.

(57) ABSTRACT

A data processing system (1) has an erasable and programmable non-volatile memory (5) and a central processing unit (2). The central processing unit allows only a specified partial storage area (20Ba) of the non-volatile memory to be intended for a software ECC process. Since ECC codes are added to the partial storage area alone and an error correction is made thereto to thereby increase the number of rewrite assurances, substantially needless waste of each storage area by ECC codes can be avoided as compared with a configuration in which the ECC codes are added to all the write data without distinction regardless of the storage areas. Further, since software copes with ECC processing, ECC correcting capability matched with a device characteristic of the non-volatile memory can easily be selected.

47 Claims, 29 Drawing Sheets

| NUMBER OF USER DATA BITS | NUMBER OF ECC CODE BITS | OVERHEAD | CORRECTING CAPABILITY |
|---|---|---|---|
| 8 BITS | 4 BITS | 50% | 1 BIT OF 8 BITS |
| 16 BITS | 5 BITS | 31% | 1 BIT OF 16 BITS |
| 32 BITS | 6 BITS | 19% | 1 BIT OF 32 BITS |
| 64 BITS | 7 BITS | 11% | 1 BIT OF 64 BITS |
| 128 BITS | 8 BITS | 6% | 1 BIT OF 128 BITS |
| 256 BITS | 9 BITS | 4% | 1 BIT OF 256 BITS |

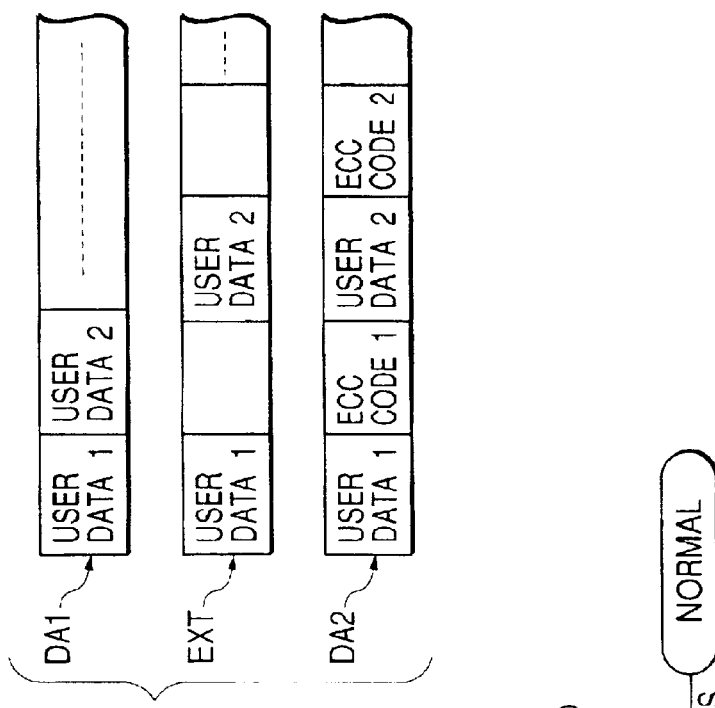
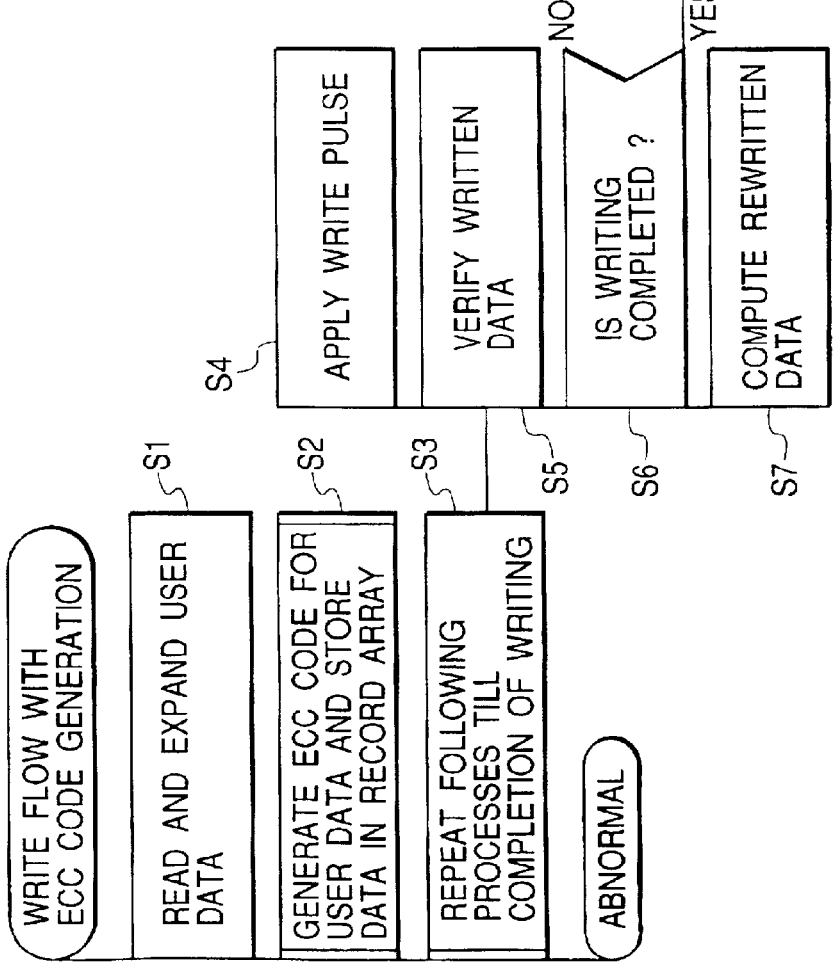
FIG. 6(A)
FIG. 6(B)

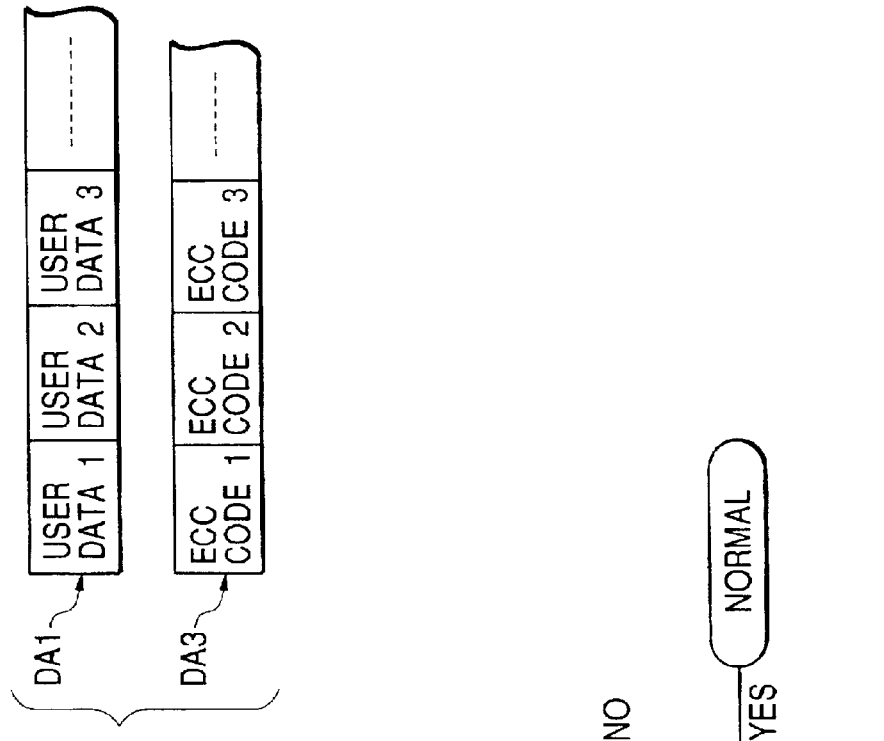
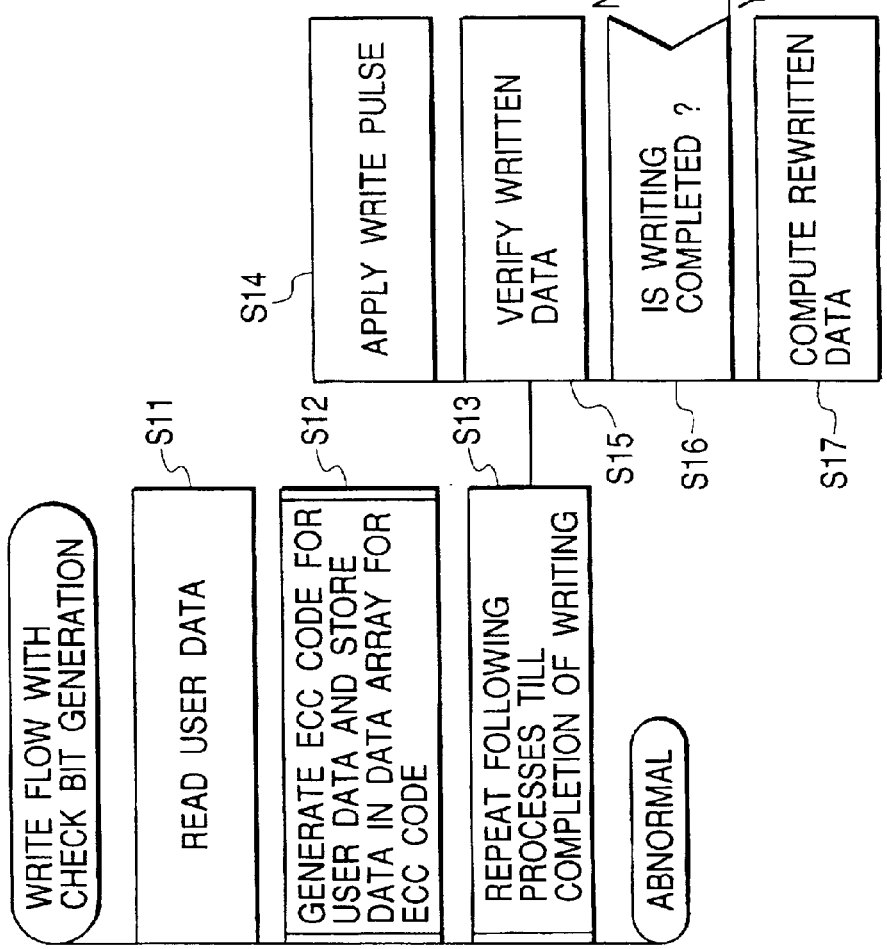

FIG. 13

(GENERATION MATRIX) 41

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1 | 1 | 0 | 0 | 0 | 0 | 0 | 0 | 0 | 0 | 0 | 0 | 0 | 0 | 0 | 0 | 0 | 1 | 0 | 1 | 0 | 1 |
| 2 | 0 | 1 | 0 | 0 | 0 | 0 | 0 | 0 | 0 | 0 | 0 | 0 | 0 | 0 | 0 | 0 | 1 | 0 | 1 | 0 | 0 |
| 3 | 0 | 0 | 1 | 0 | 0 | 0 | 0 | 0 | 0 | 0 | 0 | 0 | 0 | 0 | 0 | 0 | 1 | 0 | 0 | 1 | 1 |
| 4 | 0 | 0 | 0 | 1 | 0 | 0 | 0 | 0 | 0 | 0 | 0 | 0 | 0 | 0 | 0 | 0 | 1 | 0 | 0 | 0 | 0 |
| 5 | 0 | 0 | 0 | 0 | 1 | 0 | 0 | 0 | 0 | 0 | 0 | 0 | 0 | 0 | 0 | 0 | 0 | 1 | 0 | 1 | 1 |
| 6 | 0 | 0 | 0 | 0 | 0 | 1 | 0 | 0 | 0 | 0 | 0 | 0 | 0 | 0 | 0 | 0 | 0 | 1 | 1 | 0 | 0 |
| 7 | 0 | 0 | 0 | 0 | 0 | 0 | 1 | 0 | 0 | 0 | 0 | 0 | 0 | 0 | 0 | 0 | 0 | 1 | 1 | 1 | 1 |
| 8 | 0 | 0 | 0 | 0 | 0 | 0 | 0 | 1 | 0 | 0 | 0 | 0 | 0 | 0 | 0 | 0 | 0 | 1 | 1 | 0 | 0 |
| 9 | 0 | 0 | 0 | 0 | 0 | 0 | 0 | 0 | 1 | 0 | 0 | 0 | 0 | 0 | 0 | 0 | 0 | 1 | 0 | 0 | 1 |
| 10 | 0 | 0 | 0 | 0 | 0 | 0 | 0 | 0 | 0 | 1 | 0 | 0 | 0 | 0 | 0 | 0 | 0 | 0 | 0 | 1 | 0 |
| 11 | 0 | 0 | 0 | 0 | 0 | 0 | 0 | 0 | 0 | 0 | 1 | 0 | 0 | 0 | 0 | 0 | 0 | 0 | 0 | 1 | 1 |
| 12 | 0 | 0 | 0 | 0 | 0 | 0 | 0 | 0 | 0 | 0 | 0 | 1 | 0 | 0 | 0 | 0 | 0 | 0 | 1 | 0 | 0 |
| 13 | 0 | 0 | 0 | 0 | 0 | 0 | 0 | 0 | 0 | 0 | 0 | 0 | 1 | 0 | 0 | 0 | 0 | 0 | 1 | 1 | 1 |
| 14 | 0 | 0 | 0 | 0 | 0 | 0 | 0 | 0 | 0 | 0 | 0 | 0 | 0 | 1 | 0 | 0 | 0 | 0 | 1 | 0 | 0 |
| 15 | 0 | 0 | 0 | 0 | 0 | 0 | 0 | 0 | 0 | 0 | 0 | 0 | 0 | 0 | 1 | 0 | 0 | 0 | 1 | 1 | 1 |
| 16 | 0 | 0 | 0 | 0 | 0 | 0 | 0 | 0 | 0 | 0 | 0 | 0 | 0 | 0 | 0 | 1 | 0 | 0 | 0 | 1 | 1 |

(CHECK MATRIX) 42

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1 | 1 | 1 | 1 | 1 | 1 | 0 | 0 | 0 | 0 | 1 | 0 | 1 | 1 | 0 | 0 | 0 | 1 | 0 | 0 | 0 | 0 |
| 2 | 0 | 0 | 0 | 0 | 0 | 1 | 1 | 1 | 1 | 1 | 1 | 1 | 0 | 0 | 0 | 0 | 0 | 1 | 0 | 0 | 0 |
| 3 | 1 | 0 | 1 | 0 | 0 | 1 | 1 | 0 | 0 | 0 | 1 | 0 | 1 | 1 | 1 | 0 | 0 | 0 | 1 | 0 | 0 |
| 4 | 0 | 1 | 0 | 1 | 0 | 1 | 0 | 1 | 0 | 1 | 0 | 0 | 0 | 1 | 0 | 1 | 0 | 0 | 0 | 1 | 0 |
| 5 | 1 | 0 | 0 | 0 | 1 | 0 | 1 | 0 | 1 | 0 | 0 | 1 | 1 | 0 | 1 | 1 | 0 | 0 | 0 | 0 | 1 |

FIG. 14

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 21 | 1 | 0 | 1 | 0 | 1 | 0 | 1 | 0 | 1 | 0 | 1 | 0 | 1 | 1 | 0 | 1 |
| 20 | 0 | 0 | 1 | 1 | 0 | 1 | 1 | 0 | 0 | 1 | 0 | 1 | 1 | 0 | 1 | 1 |
| 19 | 1 | 1 | 0 | 0 | 1 | 1 | 0 | 1 | 0 | 0 | 1 | 1 | 1 | 1 | 1 | 0 |
| 18 | 0 | 0 | 0 | 0 | 1 | 1 | 1 | 1 | 1 | 1 | 0 | 1 | 0 | 0 | 0 | 0 |
| 17 | 1 | 1 | 1 | 1 | 1 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 1 |
| 15 | 0 | 0 | 0 | 0 | 0 | 0 | 0 | 0 | 0 | 0 | 0 | 0 | 0 | 0 | 1 | 0 |
| 14 | 0 | 0 | 0 | 0 | 0 | 0 | 0 | 0 | 0 | 0 | 0 | 0 | 0 | 1 | 0 | 0 |
| 13 | 0 | 0 | 0 | 0 | 0 | 0 | 0 | 0 | 0 | 0 | 0 | 0 | 1 | 0 | 0 | 0 |
| 12 | 0 | 0 | 0 | 0 | 0 | 0 | 0 | 0 | 0 | 0 | 0 | 1 | 0 | 0 | 0 | 0 |
| 11 | 0 | 0 | 0 | 0 | 0 | 0 | 0 | 0 | 0 | 0 | 1 | 0 | 0 | 0 | 0 | 0 |
| 10 | 0 | 0 | 0 | 0 | 0 | 0 | 0 | 0 | 0 | 1 | 0 | 0 | 0 | 0 | 0 | 0 |
| 9 | 0 | 0 | 0 | 0 | 0 | 0 | 0 | 0 | 1 | 0 | 0 | 0 | 0 | 0 | 0 | 0 |
| 8 | 0 | 0 | 0 | 0 | 0 | 0 | 0 | 1 | 0 | 0 | 0 | 0 | 0 | 0 | 0 | 0 |
| 7 | 0 | 0 | 0 | 0 | 0 | 1 | 0 | 0 | 0 | 0 | 0 | 0 | 0 | 0 | 0 | 0 |
| 6 | 0 | 0 | 0 | 0 | 1 | 0 | 0 | 0 | 0 | 0 | 0 | 0 | 0 | 0 | 0 | 0 |
| 5 | 0 | 0 | 0 | 1 | 0 | 0 | 0 | 0 | 0 | 0 | 0 | 0 | 0 | 0 | 0 | 0 |
| 4 | 0 | 0 | 1 | 0 | 0 | 0 | 0 | 0 | 0 | 0 | 0 | 0 | 0 | 0 | 0 | 0 |
| 3 | 0 | 0 | 1 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 |
| | m15 | m14 | m13 | m12 | m11 | m10 | m9 | m8 | m7 | m6 | m5 | m4 | m3 | m2 | m1 | m0 |

CONFIGURATION OF ECC DATA BLOCK

| BIT | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| FUNCTION NAME | D15 | D14 | D13 | D12 | D11 | D10 | D09 | D08 | D07 | D06 | D05 | D04 | D03 | D02 | D01 | D00 |
| DEFAULT VALUE | | | | | | | | | | | | | | | | |
| REMARKS | USER-WRITTEN DATA (DATA THAT USER DESIRES TO ERROR-CORRECT) | | | | | | | | | | | | | | | |

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| FUNCTION NAME | – | – | – | – | – | – | – | – | – | – | – | P04 | P03 | P02 | P01 | P00 |
| DEFAULT VALUE | USER TRANSFER ALL "1" | | | | | | | | | | | | | | | |
| REMARKS | UNUSED | | | | | | | | | | | CODING CHECK BIT | | | | |

FIG. 25

| RETRIEVAL ADDRESS (Z) | DATA FOR GENERATION (Y) | FUNCTION NAME |
|---|---|---|
| X | b'0000_0011 | D00 |
| X+1 | b'0000_0101 | D01 |
| X+2 | b'0000_0110 | D02 |
| X+3 | b'0000_0111 | D03 |
| X+4 | b'0000_1001 | D04 |
| X+5 | b'0000_1010 | D05 |
| X+6 | b'0000_1011 | D06 |
| X+7 | b'0000_1100 | D07 |
| X+8 | b'0000_1101 | D08 |
| X+9 | b'0000_1110 | D09 |
| X+A | b'0000_1111 | D10 |
| X+B | b'0001_0001 | D11 |
| X+C | b'0001_0010 | D12 |
| X+D | b'0001_0011 | D13 |
| X+E | b'0001_0100 | D14 |
| X+F | b'0001_0101 | D15 |
| X+10 | b'0000_0001 | P00 |
| X+11 | b'0000_0010 | P01 |
| X+12 | b'0000_0100 | P02 |
| X+13 | b'0000_1000 | P03 |
| X+14 | b'0001_0000 | P04 |

ECC TABLE (ECCTLB)

DATA PROCESSING SYSTEM AND DATA PROCESSING METHOD

BACKGROUND OF THE INVENTION

The present invention relates to a technology for improving the number of rewrite assurances for a non-volatile memory, for example, a technology effective for application to a microcomputer with an electrically erasable and programmable flash memory built therein.

An electrically erasable and programmable non-volatile memory (hereinafter also called simply "flash memory") such as a flash memory or the like stores information according to the difference between threshold voltages programmed to memory cells. The difference between the threshold voltages is obtained according to the difference between the values or amounts of electrons or positive holes held in a floating gate. The performance of holding the electrons or positive holes in the flash memory is degraded with an increase in the number of rewritings. Accordingly, the number of rewrite assurances finite for the use of the flash memory is normally taken into consideration from the viewpoint of the reliability of stored information.

In order to allow the number of rewritings exceeding the number of rewrite assurances corresponding to about 100 times, for example, storage areas of the flash memory are successively switched and controlled every number of rewritings corresponding to 100 times, thereby making it possible to cope with it. To this end, a large storage capacity reaching several tens of times to several thousand of times the actually-used capacity is needed.

In order to improve or increase the number of assurances for the rewriting of the flash memory, a gate oxide film can be rendered thick to enhance the performance of holding electrons or positive holes as a device-based method. Further, an ECC (Error Check and Correct) circuit can be adopted as a circuitry method or approach. A technology in which ECC is applied to an EEPROM built in a one-chip type microcomputer, has been shown in Unexamined Patent Publication No. Hei 11(1999)-296392.

An erasable and programmable non-volatile memory such as a flash memory performs information storage according to a threshold voltage corresponding to the amount of electrons or positive holes injected into a floating gate of each memory cell. A threshold voltage characteristic of such a memory cell is degraded with time according to an increase in the number of rewritings, etc. As the degradation in characteristic advances or continues, the probability that a writing error will occur upon a verify operation at data rewriting. Thus, as writing/erasing for the flash memory is repeatedly done, its characteristic is deteriorated and "spoiled bits" that information cannot be held normally, are generated. The number of rewritings assured by the flash memory or the on-chip type microcomputer using the same is limited by the degradation in characteristic. As methods of increasing or improving the number of rewritings, the following technologies have heretofore been known.

The first technology is a method or technique implemented as a circuit structure of a flash memory. It is configured in such a manner that for instance, the same bit information is written into two (a plurality of cells in general) cells upon writing, whereas upon reading, data are read from both memory cells, and if at least one is kept in a high threshold state, then data of a logical value corresponding to the high threshold state is outputted. Alternatively, a circuit for a flash memory is configured in such a manner that the same bit information is written into three or more memory cells upon writing, whereas upon reading, data are read from these cells, and majority logic of the read data is taken and the result thereof is outputted. As an example of a reference having described the flash memory having such a configuration, Unexamined Patent Publication No. Hei 3(1991)-57048 is known.

The second technology is one for providing an error-correcting function block on a chip and is intended to generate a check bit upon writing and perform an error detection and correction from the original information and check bit upon reading. As an example of a reference having described the present technology, there is known 200 Symposium on VLSI Circuits Digest of Technical Papers, pp162–165.

As the third technology, there is known one wherein as described in Unexamined Patent Publication No. Hei 7(1995)-210215, when a CPU effects data writing on an EEPROM, the data writing is made to three places corresponding to two areas lying within the EEPROM and a backup memory different from the EEPROM, and data are read from the three places when the CPU performs data reading, and when the two data thereof coincide with each other, data related to the coincidence of the two is judged to be proper.

SUMMARY OF THE INVENTION

Limitations are imposed on an improvement in the number of rewrite assurances with an increase in the thickness of the gate oxide film, and a write or programming time is expected to greatly increase.

When an ECC function is added to the flash memory by means of hardware, a circuit for generating ECC codes, and a circuit for effecting an error determination and correction on data with ECC codes are provided therein. In such a case, however, a chip area increases due to the hardware for ECC. In addition, since the ECC codes are consequentially added to all data and the storage of the data is carried out, the storage capacity of the flash memory per se also increases correspondingly. According to the technology described in Unexamined Patent Publication No. Hei 11(1999)-296392, the ECC codes are generated by software through the use of a firm ROM of a CPU, so that dedicated hardware is reduced or cut down correspondingly. On the other hand, the hardware circuit for effecting the error decision and correction on the data with the ECC codes is still provided. Further, the ECC codes are added to all the stored data and the storage of the data is performed.

In particular, the present inventors have taken into consideration use forms of a flash memory employed in a microcomputer, etc. corresponding to built-in device control applications. For instance, trimming data for circuit characteristic adjustments, table data for reference, and program data are stored in, for example, a flash memory as data relatively low in the number of rewritings. Further, data requiring frequent rewriting, like parameter data corresponding to the state of the device might also be stored in the flash memory in addition to the above. When one attempts to mix those data in one flash memory, the ECC codes are added to all the data in the conventional technology. Therefore, the use efficiency of each storage area is greatly impaired. When the amount of data to be frequently rewritten is low, a reduction in the use efficiency of each storage area in particular would become pronounced. When there is a tendency to increase the storage capacity of the non-volatile memory, the present inventors have found out utility as viewed from the viewpoint that only a partial storage area is intended for ECC.

Since the memory cell characteristic of the flash memory is placed under the influence of variations in process, memory cells easy to produce reading errors, and memory cells hard to produce the same exist even in the case of the same number of rewritings. The present inventors have paid attention to the difference between the individual memory cell characteristics and thereby have fount out utility in that the number of bits of ECC codes corresponding to the number of data bits can be determined according to the characteristic of the flash memory. In short, the present inventors have found out utility in that the selection of an ECC method matched with a device characteristic of each memory cell is enabled or allowed to obtain a predetermined number of rewrite assurances, and overhead of each ECC code for the data is reduced, whereby the use efficiency of the storage area is set to the maximum. According to the discussion of the present inventors, it became evident that the versatility of the selection of the ECC method was hard to be easily implemented where the generation of the ECC codes or the error detection and correction were achieved by hardware.

According to the first technology as well, flash memories identical in configuration cannot be applied to an application (which is used as a two-memory cell/bit configuration and sacrificed in cell use efficiency) which needs a further increase in the number of rewritings, and an application which needs the maximum cell use efficiency (i.e., one-memory cell/bit configuration) although the number of rewritings may be low. It is therefore necessary to prepare or mount a plurality of flash memories according to uses. Consequently, the efficiency of development of the flash memory becomes impaired. Further, the number of circuit modules also increases, thus leading to an increase in chip area.

The second technology is accompanied by a problem that a chip area increases due to the provision of hardware having an error correcting function like ECC, and hence a rise in cost occurs. Even if the ECC function is realized by software, a massive operating process is required as soon as error correcting capability becomes plural bits. A significant large load is placed on a CPU to hold the low rate of error generation.

The third technology needs a backup memory different from the originally-implemented or packaged EEPROM. As to this point, the reference having described the third technology shows that as compared with the case in which the EEPROM is divided into three parts and the same data is respectively written into them, the number of writings is reduced to thereby decrease the opportunity that the memory is affected by an error produced during writing. In short, the superiority of the utilization of the backup memory different from the EEPROM has been found out.

According to the discussions made by the present inventors, a flash memory on-chip implemented in a microcomputer is used to store data and programs therein. In the case of data areas, they are expected to be frequently rewritten like parameters. As to program areas, they are little rewritten except for version updating or the like. When such a situation is taken into consideration, the present inventors have found out that it is necessary to optimize functions or performance of plural storage areas so as to be suited to accomplishment of an end for the plural storage areas. It is appropriate to preferentially restrain a reduction in the reliability of information storage even if the use efficiency of each memory cell is sacrificed, because the degree of degradation in characteristic of each memory cell becomes high in, for example, storage applications such as parameters in which the number of rewritings is large, and preferentially maximize the use efficiency of each memory cell because the progress of degradation in characteristic becomes slow in an area in which the number of rewritings may be low.

An object of the present invention is to provide a data processing system capable of avoiding waste of the utilization of a storage area by error correcting information, e.g., ECC codes to thereby enhance the reliability of stored information.

Another object of the present invention is to provide a data processing system capable of avoiding waste of the utilization of a storage area by ECC codes to thereby increase or improve the number of assurances for rewriting of stored information.

A further object of the present invention is to provide a data processing system capable of selecting an ECC method matched with a device characteristic to thereby reduce overhead of each ECC code with respect to data and increase the use efficiency of each storage area to a maximum.

A still further object of the present invention is to provide a data processing system capable of minimizing a delay in data read operation due to an error determining and correcting process on data with ECC codes.

A still further object of the present invention is to provide a data processing method capable of efficiently generating ECC codes.

A still further object of the present invention is to provide a data processing method capable of efficiently performing an error determination of data with ECC codes.

A still further object of the present invention is to provide a data processing system and a data processing method capable of improving the number of rewritings in a partial address area of an address space of an electrically erasable and programmable non-volatile memory by means of a software-based process.

A still further object of the present invention is to provide a data processing system like a microcomputer, wherein one non-volatile memory can cope with applications ranging from an application in which the number of rewritings is low to an application in which the number of rewritings is great, and the need to provide new hardware for the purpose of enhancing the reliability of information storage or improving the upper-limited number of rewritings.

A still further object of the present invention is to provide a data processing system capable of preferentially restraining a reduction in reliability of information storage in an area in which rewriting is frequently made to one non-volatile memory, and preferentially maximizing the use efficiency of each memory cell in an area in which the number of rewritings may be low.

The above, other objects and novel features of the present invention will become apparent from the description of the present specification and the accompanying drawings.

Summaries of typical ones of the inventions disclosed in the present application will be described in brief as follows:

[1] A data processing system has an erasable and programmable non-volatile memory (flash memory), and a processing unit (CPU). The central processing unit executes a predetermined process (program) and is thereby capable of carrying out a process for increasing the number of assurances for rewriting in a partial storage area (20Ba) specified in an address space of the non-volatile memory as compared with the number of assurances for rewriting in other storage areas lying in the address space of the non-volatile memory. The predetermined process based on the execution of the program includes a process for generating error correcting information (ECC codes) for data written into the specified partial storage area and adding the error correcting information thereto, and a process for effecting an ECC code-based error decision and correction on data read from the specified partial storage area of the non-volatile memory. A user program carries out the designation of the partial storage area, for example.

According to the above, the addition of ECC codes and an error correction are performed to increase the number of rewrite assurances with only an access to data stored in a specified partial storage area of a non-volatile memory as an object. Frequently-rewritten parameter data is stored in the specified partial storage area, and program data or the like low in rewriting frequency are stored in other storage areas. Accordingly, no ECC codes are added to the data stored in the other storage areas. As compared with a configuration wherein ECC codes are added to all the write data without distinction regardless of each storage area, the above configuration realizes an improvement in the reliability of stored information or an increase in the number of assurances for rewriting of the stored information, while avoiding useless usage of each storage area by substantially-needless ECC codes.

Since the addition of the ECC codes to the write data, and the ECC code-based error determining and correcting process are realized by the execution of the program by the central processing unit, an ECC method for defining the rate of the number of bits of ECC codes to the number of bits of data can be selected according to the described contents of program. Therefore, the selection of an ECC method matched with a device characteristic of each memory cell is easy, and overhead of each ECC code with respect to the data can be reduced. As a result, the use efficiency of each storage area can be maximized. In short, since the efficiency of error correction can be changed by software, an error correcting method matched with the capability of a device can easily be selected. From another standpoint, this eliminates waste from the number of bits for the ECC codes, and assures effective utilization of each storage area.

The data processing system can be implemented as a single chip type microcomputer wherein the non-volatile memory and the central processing unit are formed on a single semiconductor chip. On the other hand, the data processing system may be implemented in a multi-chip form wherein the non-volatile memory and the central processing unit are respectively formed on discrete semiconductor chips.

The predetermined program executed by the central processing unit comprises, for example, an ECC code generating program for generating ECC codes for data written into the specified partial storage area of the non-volatile memory, and an error-correcting program for effecting an error decision and an error correction on the data with ECC codes read from the specified partial storage area of the non-volatile memory.

In the known method of performing ECC-based coding and an error correction, for example, a check matrix of hamming codes is used. Upon the error correction, a matrix operation of read data and hamming codes can be carried out by use of a sum-of-products computation or the like. When data is defined as n bits and ECC codes with respect to the n-bit data are defined as m bits herein, a matrix table in which m-bit binary numbers different from one another are arranged in an m+n sequence or array, is formed in the corresponding storage area. The processes of the ECC code generating program and the error-correcting program are executed by reference to the matrix table.

Upon generating the ECC codes, for example, values in columns of the matrix table, corresponding to bit positions of logical values "1" of data are exclusive-ORed every bits as viewed in a row direction. The values of m bits obtained from the exclusive-ORing are set as the ECC codes, and the ECC codes are added to data respectively to thereby generate code words of m+n bits. Upon an error determination and an error correction, values in columns of the matrix table, corresponding to bit positions of logical values "1" of the code words are exclusive-ORed every bits as viewed in the row direction. When the values of m bits obtained by the exclusive-ORing are of a logical value "0" in all bits, an error-free decision is made to thereby set the n-bit data of the cord words as normal data. When the values of m bits obtained by the exclusive-ORing are of a logical value "1" even one bit, a decision as to the presence of an error is made. Thus, a column coincident with a binary number of m bits obtained by the exclusive-ORing is retrieved from the columns of the matrix table, and bits of code words at positions associated with the retrieved column are inverted in logical value and corrected, whereby the n-bit data of the corrected code words are defined as normal data. The error determination eliminates the need for processes like a sum-of-products computation and a dividing operation, and ECC processing under software can efficiently be carried out even if a sum-of-products operator and a divider are not provided.

The ECC code generating program and the error-correcting program may be held in a mask ROM accessible by the central processing unit. When the non-volatile memory is used to hold these programs, they may be held in other storage areas respectively. Since the frequency of rewriting of each program is low as compared with parameters, other storage areas relatively low in the number of rewrite assurances will be enough if they are held in other storage areas. In short, if poor use conditions are excluded, then such a practical profit that ECC codes are added to information low in rewrite frequency, is little obtained.

When an erase prohibition area (20A) in which an erase operation is prohibited, and a rewrite allowable area (20B) in which erasing and writing are allowed, are assigned to other storage areas of the non-volatile memory, the ECC code generating program and the error-correcting program may be stored in the erase prohibition area. Since the rewriting of each temporarily-written program is not possible en principe in this case, a maker for manufacturing a data processing system like a microcomputer brought into semiconductor integrated circuit form may desirably write each program. If done so, then the formats of data and ECC codes may preferably be determined on a fixed basis in advance. According to the ECC code generating program, ECC codes are generated and thereafter the generated ECC codes and data corresponding thereto are stored in their corresponding partial storage area of the non-volatile memory as data with the ECC codes in accordance with a prescribed format. The error-correcting program may recognize the ECC code-added data according to the prescribed fixed format.

Further, the ECC code generating program and the error-correcting program may be held in the rewrite allowable area. Let's assume that those programs are written by a user in this case. Accordingly, the formats of the data and ECC codes may be arbitrary formats dependent on a program created by the user. If the usability of the user is taken into consideration even where a maker attempts to provide or offer the programs, then they may be offered in the form of a source program described in a high-level language such as a C language. The data and ECC codes may also be grasped as discrete arrays.

As one means for improving or increasing an ECC processing speed, when an access cycle of a random access memory (RAM) is faster than that of the non-volatile memory, the ECC code generating program and the error-correcting program are transferred from the non-volatile memory to the RAM, and the central processing unit may be caused to execute the ECC code generating program and error-correcting program transferred to the RAM. At this time, the central processing unit may transfer the ECC code generating program and the error-correcting program from the non-volatile memory to the RAM in response to reset instructions.

As second means for improving the ECC processing speed, there is provided a RAM accessible by the central processing unit. The central processing unit successively reads data with ECC codes from the partial storage area of the non-volatile memory in response to reset instructions, effects the error decision and error correction on the read data with ECC codes according to the execution of the error-correcting program, and initially stores the data subjected to the error determining and correcting process in the RAM. Thereafter, the CPU may read necessary data from the RAM and needs not make an error decision in each case upon a read operation. Incidentally, as a method of executing the error-correcting program by the CPU, either one of a method for directly reading the error-correcting program from the non-volatile memory and executing it, and a method for reading the error-correcting program transferred to the RAM and executing it may be adopted.

When an uncorrectable error has occurs in the error determining process under the execution of the error-correcting program, the central processing unit may cause a register (RER) or a flag area (30) of a memory to retain or hold information indicative of the occurrence of the error uncorrectable in the error determining process placed under the execution of the error-correcting program, recognizably from the outside in terms of the prevention of a malfunction. If reference is made to the flag area through a user program every predetermined intervals, it is then possible to recognize the occurrence of the uncorrectable error, e.g., execute and cope with the rewriting or the like of a data block in which each uncorrectable error has occurred.

Even when error-correctable data is detected according to the execution of the error-correcting program, the central processing unit may cause a general-purpose register or a flag area of a memory to hold or retain information indicative of it recognizably from the outside. Such information may be utilized as warning information in the same manner as the above. Thus, a user system is capable of instantaneously recognizing that data is on the point of damaging. Further, the user system promotes the reloading (rewriting) of the data on the point of damaging to thereby make it possible to further improve the reliability of the data.

[2] A data processing system according to another aspect of the present invention has a first storage area (20Bb) low in the number of rewrite assurances, and a second storage area (20Ba) high in the number of rewrite assurances, both being provided in an address space of an arithmetic control device. The first storage area includes an ECC code generating program for generating each of ECC codes for data to be written in the second storage area, and an error-correcting program for effecting an error decision and an error correction on data with the ECC codes read from the second storage area. The arithmetic control device executes the ECC code generating program when data is stored in the second storage area.

Since software generates ECC codes only for a write operation with respect to the second storage area in this viewpoint, an improvement in the reliability of stored information or an increase in the number of rewrite assurances for the stored information can be implemented in the same manner as described above while avoiding useless usage of the storage area by substantially-needless ECC codes. Further, since the addition of ECC codes to write data is realized by the execution of a program, an ECC method matched with the characteristic of a device of each memory cell in a non-volatile memory is easily selected in the same manner. Further, overhead of each ECC code for the data can be reduced, and the use efficiency of the storage area can be maximized.

When each data is read from the second storage area, the arithmetic control device executes the error-correcting program.

The arithmetic control device is capable of executing the error-correcting program in response to a predetermined operation mode and successively transferring the data of the second storage area to a RAM in advance.

Each of the first storage area and the second storage area is an electrically erasable and programmable flash memory, for example. When the rewriting of an ECC code generating program and an error-correcting program is taken into consideration, a write or programming/erase program is stored in the flash memory in advance and transferred to the inside of the RAM in response to a predetermined operation mode. Further, the write/erase program on the RAM may be executed to rewrite the ECC code generating program and error-correcting program. Alternatively, the write/erase program is externally transferred to the RAM in response to the predetermined operation mode. In addition, the write/erase program on the RAM may be executed to carry out the rewriting of the ECC code generating program and error-correcting program.

[3] In a data processing method for generating code words using ECC codes, when the ECC codes are defined as m bits with respect to data of n bits, a matrix table wherein mutually-different binary numbers of m bits are arranged in an m+n array, is utilized. Upon generation of the ECC codes, values in columns of the matrix table, corresponding to bit positions of logical values "1" of data are exclusive-ORed every bits as viewed in a row direction. The values of m bits obtained from the exclusive-ORing are defined as the ECC codes, and the ECC codes are added to data respectively to thereby generate code words of m+n bits.

In the data processing method for making an error determination to the code words, values in columns of the matrix table, corresponding to bit positions of logical values "1" of the code words are exclusive-ORed every bits as viewed in the row direction. When the values of m bits obtained by the exclusive-ORing are of a logical value "0" in all bits, an error-free decision is made and hence the n-bit data of the cord words are set as normal data. When the values of m bits obtained by the exclusive-ORing are of a logical value "1" even one bit, an error is judged to exist. Thus, a column coincident with a binary number of m bits obtained by the exclusive-ORing is retrieved from the columns of the matrix table. Further, bits of code words at positions associated with the retrieved column are inverted in logical value and corrected, and thereby the n-bit data of the corrected code words are set as normal data. The error determination eliminates the need for processes like a sum-of-products computation and a dividing operation. Even if a CPU is used which has operators such as an arithmetic and logical unit, a shifter, etc. and a divider but has no a sum-of-products operator, ECC processing based on software can efficiently be carried out.

A data processing system has a CPU, and an erasable and programmable non-volatile memory. The CPU is capable of storing one data in memory cells at different addresses when information is written in a specific block corresponding to part of a storage area in the non-volatile memory, reading data from the memory cells at the different addresses when data is read from the specific block, and performing a logical operation on the read plural data to thereby effect a necessary error correction on the data.

According to the above, a partial area in which rewriting is frequently effected on a single non-volatile memory, is defined as a specific block and intended for writing and a necessary error-correcting process, whereby priority can be given to the suppression of degradation in the reliability of the storage of information in the partial storage area. In an area in which the number of rewritings may be low, priority can be placed on the fact that the area is not intended for processing as the specific block to thereby maximize the use efficiency of each memory cell. Thus, one non-volatile memory can cope with applications ranging from an application in which the number of rewritings is low to an application in which the number of rewritings is great, and new hardware is not necessary to enhance the reliability of the storage of information or increase the upper-limited number of rewritings.

When the number of the different addresses is two or more, for example, the logical operation executed by the CPU may be a logical OR operation or a logical AND operation or the like based on the execution of an instruction included in an instruction set of the CPU. When, for example, a non-volatile memory is a flash memory capable of storing information therein according to high and low levels of a threshold voltage, the information stored in the memory cell is determined based on the amount of electrons or positive holes held by a floating gate. Let's assume that a threshold voltage changes from a high to a low threshold voltages due to degradation in characteristic on condition that memory or storage information which responds to a state of a threshold voltage higher than a threshold voltage in a thermal equilibrium state, for example, is of a logical "1", and memory information responsive to a low state of threshold voltage is of a logical value "0". Owing to the use of a logical OR operation in this case, the damage of undesired memory information from "1" to "0" due to the degradation in characteristic can be prevented unless all the data stored at the different plural addresses per data are inverted to "0". On the other hand, let's assume that the threshold voltage changes from a low to a high threshold voltages due to degradation in characteristic. Owing to the use of a logical AND operation in this case, the damage of undesired memory information from "0" to "1" due to degradation in characteristic can be prevented unless all the data stored at the different plural addresses per data are inverted to "1". Let's assume that contrary to the above, a threshold voltage changes from a high to a low threshold voltages due to degradation in characteristic on condition that memory or storage information which responds to a state of a threshold voltage higher than a threshold voltage in a thermal equilibrium state, for example, is of a logical "0", and memory information responsive to a low state of threshold voltage is of a logical value "1". Owing to the use of a logical AND operation, the damage of undesired memory information from "0" to "1" due to the degradation in characteristic can be prevented unless all the data stored at the different plural addresses per data are inverted to "1". On the other hand, let's assume that the threshold voltage changes from a low to a high threshold voltages due to degradation in characteristic. Owing to the use of a logical OR operation in this case, the damage of undesired memory information from "1" to "0" due to degradation in characteristic can be prevented unless all the data stored at the different plural addresses per data are inverted to "0".

When, for example, the number of the different addresses is three or more, the logical operation executed by the CPU may be used as a computing process which adopts a majority decision done by the execution of a plurality of instructions. This can cope with both a failure of "1" to "0" and a failure of "0" to "1".

The non-volatile memory may store a program for storing the one data in the memory cells at the different addresses, a program for performing the error correction, and other programs in a block different from the specific block.

The specific block has a product spec for assuring the number of rewritings greater than other blocks.

The non-volatile memory is an electrically erasable and programmable flash memory, for example. The CPU and the non-volatile memory may be formed on a single semiconductor chip which constitutes a microcomputer. Further, the CPU and the non-volatile memory may respectively be formed on discrete semiconductor chips.

BRIEF DESCRIPTION OF THE DRAWINGS

FIG. 6 is an explanatory diagram illustrating by way of example, a procedure executed when user data and ECC codes are written into on array data in association with one another;

FIG. 7 is an explanatory diagram illustrating by way of example, a procedure executed when user data and ECC codes are written as other array data in association with one another;

FIG. 13 is an explanatory diagram showing one example of a matrix table 40 for one-bit correction to 16-bit data;

FIG. 14 is a diagram for describing a principle-based method for generating code words with ECC codes;

FIG. 18 is an explanatory diagram showing a principle-based method for an error determining process;

FIG. 19 is an explanatory diagram illustrating by way of example, an error-free determination result obtained by the exclusive ORing in the example illustrated in FIG. 18;

FIG. 20 is an explanatory diagram illustrating by way of example, a case in which a determination result having a one-bit error with respect to FIG. 19 is obtained;

FIG. 21 is an explanatory diagram listing determination results at the time that uncorrectable errors of two or more bits have occurred therein;

FIG. 24 is an explanatory diagram illustrating more details about the fixed format of FIG. 23 as an illustrative example;

FIG. 25 is an explanatory diagram illustrating by an example, an ECC table having data of a matrix table;

DETAILED DESCRIPTION OF THE PREFERRED EMBODIMENTS

Preferred embodiments of the present invention will hereinafter be described in detail with reference to the accompanying drawings.

Embodiment 1:

<<Microcomputer>>

Figure 1:
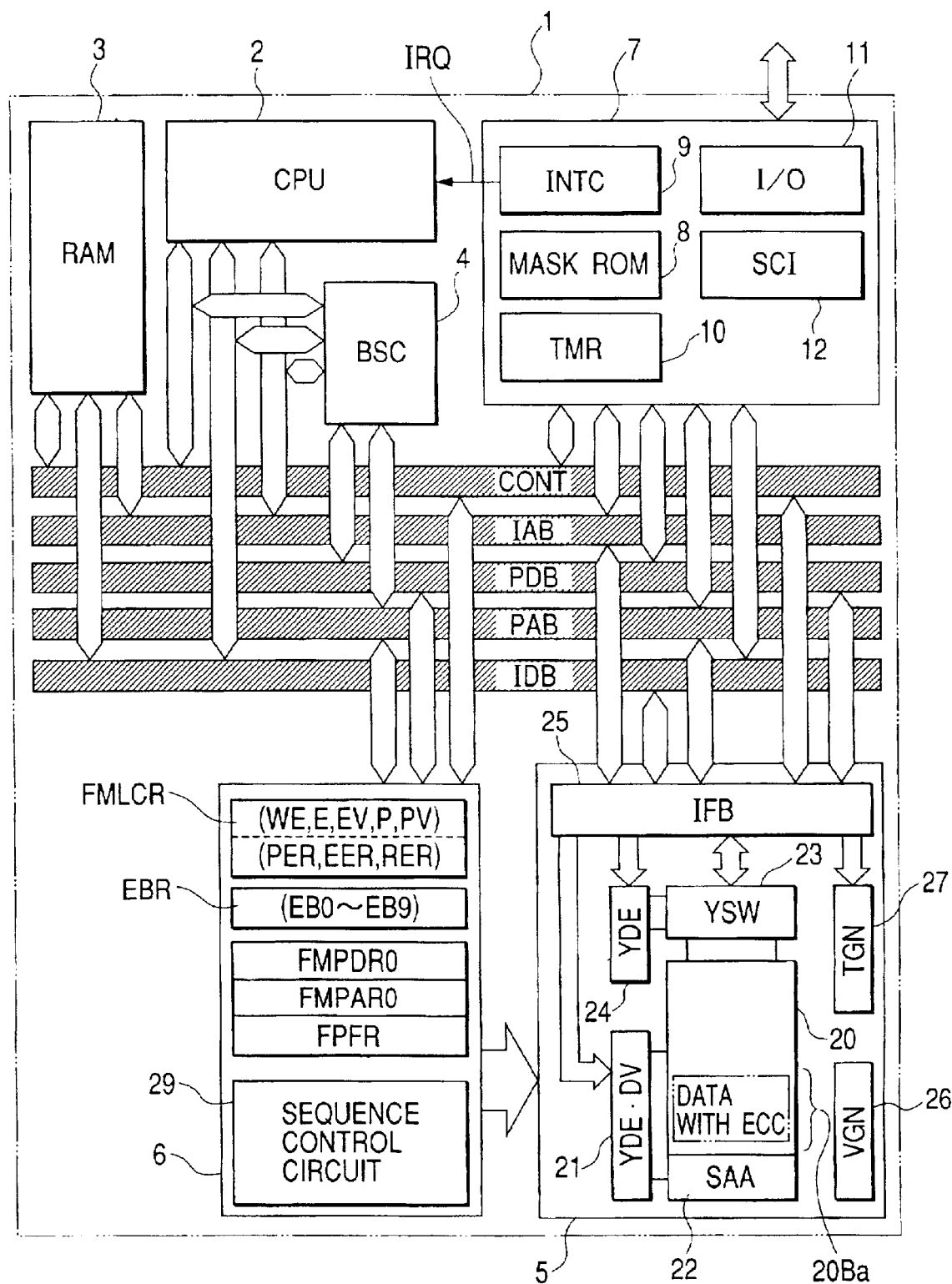
FIG. 1 is a block diagram showing a single-chip microcomputer according to one embodiment of the present invention.

FIG. 1 shows a single-chip type microcomputer according to one embodiment of the present invention. Although not restricted in particular, the microcomputer 1 shown in the same drawing is formed on a single semiconductor substrate (semiconductor chip) by a CMOS integrated circuit manufacturing technology.

The microcomputer 1 includes a central processing unit (CPU) 2 used as an arithmetic control device or unit, a RAM 3, a bus state controller (BSC) 4, a flash memory 5 used as an electrically erasable and programmable non-volatile memory, a flash control module 6, and other module 7 which is a general term for other built-in circuits. The other module 7 include a mask ROM 8, an interrupt controller (INTC) 9, a timer (TMR) 10, an input/output port (I/O) 11 and a serial interface controller (SCI) 12, etc. These circuit modules are interfaced via buses IAB, IDB, PAB, PDB and CONT.

The buses IAB and IDB are respectively an internal address bus and an internal data bus relatively fast in information transmission rate. The buses PAB and PDB are respectively a peripheral address bus and a peripheral data bus relatively slow in information transmission speed. The bus CONT is a general term for control signal lines for transmitting bus access control signals, timing control signals, etc. The BSC 4 optimally controls an access operation timing or the like with respect to the differences in operating speed between the internal buses IDB and IAB and the peripheral buses PDB and PAB or the difference between access forms inherent in objects to be accessed. Further, the BSC 4 also performs control on the selection of a chip or the selection of each module, etc. according to an access address.

Although not restricted in particular, the CPU 2 fetches an instruction from the mask ROM 8 or the RAM 3 and decodes and executes the fetched instruction. The RAM 3 serves as a work area for the CPU 2 or a temporary storage area for data or a program. The mask ROM 8 serves as a storage area for a program or a data table or the like. The interrupt controller 10 honors or takes an interrupt request supplied from outside the microcomputer 1 or an interrupt request generated from an internal circuit module according to the internal state of the microcomputer 1 and arbitrates the reception of the interrupt request according to an interrupt priority and an interrupt mask or the like. When the interrupt request is accepted, an interrupt signal IRQ is supplied to the CPU 2, so that an interrupt factor or parameter is given to the CPU 2 by an interrupt vector. The CPU 2 causes the processing to branch to a program specified by the interrupt vector. The I/O 11 is used for connections to an external address bus and an external data bus, the interface of the SCI 12 to the outside, the input of an external event signal to the TMR 10, etc.

Figure 2:
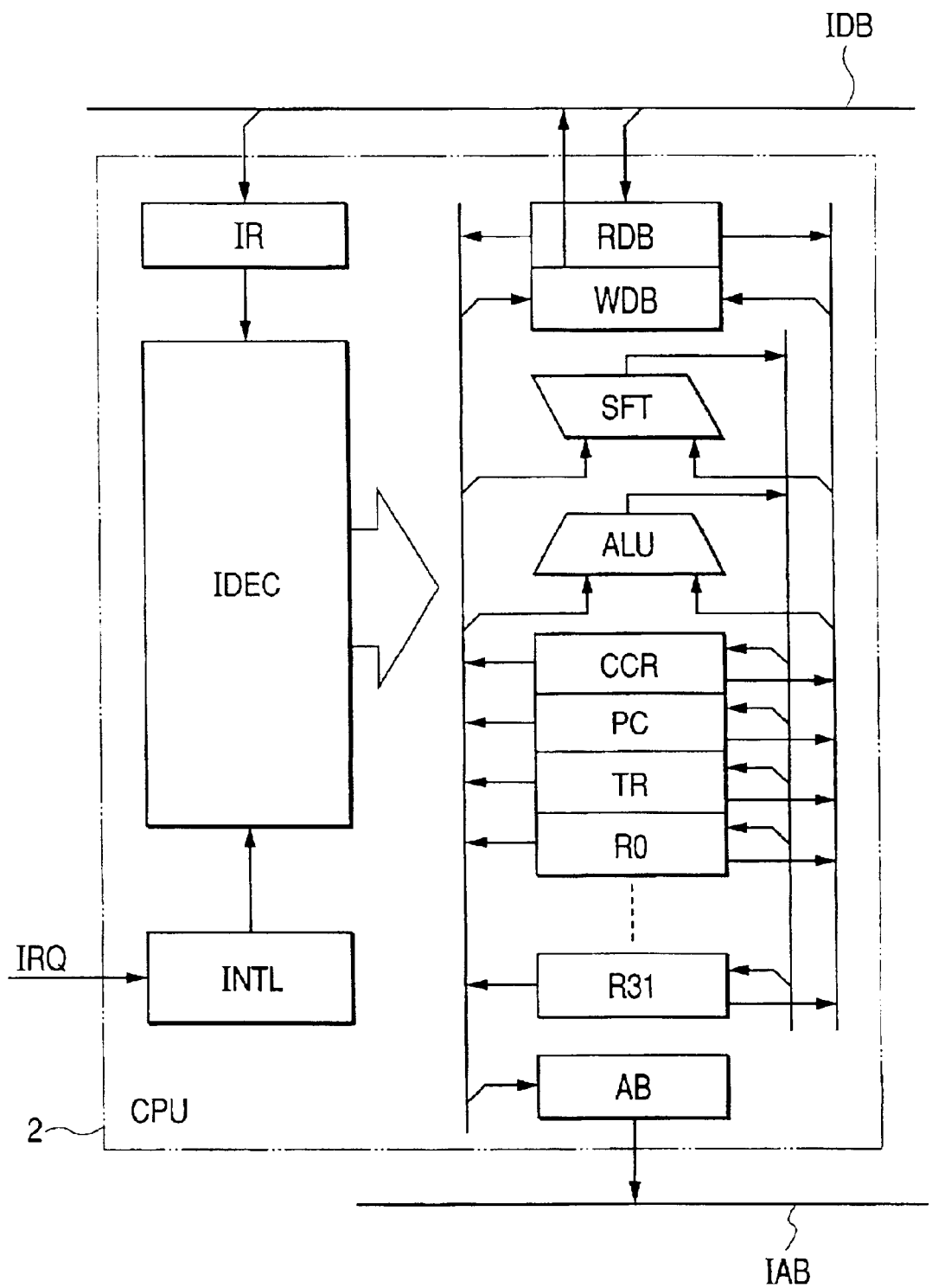
FIG. 2 is a block diagram illustrating a specific example of a CPU.

A specific example of the CPU 2 is shown in FIG. 2. Although not restricted in particular, the CPU 2 includes, at an execution portion, operators or computing units such as a shifter SFT and an arithmetic and logical unit ALU, etc., a register group comprising 32-bit general-purpose registers R0 through R31, a program counter PC, a condition code register CCR and a temporary register TR, etc., and buffer circuits such as a read data buffer RDB, a write data buffer WDB and an address buffer AB, etc. An instruction control part includes an instruction register IR, an instruction decoder IDEC, and an instruction sequence logic INTL.

The program counter PC has an instruction address to be next executed. When the instruction address is outputted from the address buffer AB to the internal address bus IAB, an instruction read from the corresponding address in the RAM 3 or the like is fetched into the instruction register IR through the internal data bus IDB. The instruction decoder IDEC decodes the instruction fetched into the instruction register IR to generate control signals used for the inside of the CPU 2, thereby controlling a computing process done by the execution portion. The instruction sequence logic INTL performs control for changing an instruction execution sequence in response to the interrupt signal IRQ or the like.

In FIG. 1, the flash memory 5 has a memory cell array 20, an X decoder/driver (XDE/DV) 21, a sense amplifier array (SAA) 22, a Y switch array (YSW) 23, a Y decoder (YDE) 24, an input/output circuit (IFB) 25, a power circuit or voltage generator (VGN) 26, and a timing generator (TGN) 27. The memory cell array 20 has flash memory cells (not shown) placed in matrix form. Although not restricted in particular, each of the flash memory cells has a stack structure wherein a source and drain are provided on a semiconductor substrate or a well region, and floating and control gates are respectively formed over or above a channel with an insulating film interposed therebetween. The source of the flash memory cell is connected to a source line, the drain thereof is connected to a bit line, and the control gage thereof is connected to a word line, respectively.

The flash memory cell has a threshold voltage set programmable and holds or retains information according to the programmed threshold voltage. When one flash memory cell holds one-bit information therein, for example, a relatively high threshold voltage state is defined as a write or programming state, and a relatively low threshold voltage state is defined as an erase state. Although not restricted in particular, a writing or programming operation for obtaining the programming state is as follows. 10V is applied to the control gate, e.g., 5V is applied to the drain, and, e.g., 0V is applied to the source and the semiconductor substrate to thereby cause a current to flow between the source and drain, whereby the injection of hot electrons occurs and hence the electrons are stored in the floating gate, thereby increasing the threshold voltage of the corresponding memory cell. Although not restricted in particular, an erasing operation for obtaining the erase state is as follows. 10V is applied to the control gate, e.g., −10V is applied to the source and the semiconductor substrate, and the drain is rendered open (floating), for example, to thereby discharge electrons stored in the floating gate into the substrate, whereby the threshold voltage of the corresponding memory cell is reduced.

The input/output circuit 25 inputs addresses, control signals and commands from the buses IAB, IDB, PAB, PDB and CONT and performs the input/output of data therebetween. The address signals inputted to the input/output circuit 25 are inputted to the XDEC/DV 21 and the YDE 24, where they are respectively decoded. The XDEC/DV 21 selects a corresponding word line according to the result of its decoding. The YDE 24 selects a corresponding bit line according to the result of its decoding through the YSW 23. The corresponding flash memory cell is selected according to the selection of the word line and the selection of the bit line. Upon a read operation, data read from the selected flash memory cell is detected by the SAA 22 and outputted to the bus PDB or IDB via the input/output circuit 25. Upon a write operation, write data supplied to the input/output circuit 25 from the bus PDB or IDB is latched in a write latch circuit lying within the input/output circuit 25. Control on write/write inhibition is effected on the word-line selected memory cell according to the latched data. Prior to write processing, the erasing of data from the flash memory cell is carried out in advance in block units.

The voltage generator 26 has a clamp circuit, a charge pump circuit, etc. and supplies various voltages used for operations such as the writing or programming, erasing and reading of the flash memory. The timing generator 27 generates internal timing signals used for the flash memory, based on a strobe signal supplied via the control bus CONT and commands inputted via the data buses PDB and IDB.

In FIG. 1, the flash control module 6 is a circuit block used for sequence control and ECC processing for writing and erasing of data into and from the flash memory 5. The flash control module 6 includes 32-bit control registers such as a write or programming/erase control register FLMCR, an erase block designation register EBR, data registers FMPDR0 and FMPAR0, and a result register FPER, etc. which are capable of being respectively accessed by the CPU 2. Further, the flash control module 6 has a sequence control circuit 29 for controlling the sequence operation of the writing and erasing of the data into and from the flash memory.

The write/erase control register FLMCR is a register for controlling an operation mode of the flash memory 5, which has a write enable bit WE for providing write valid/invalid instructions, an erase bit E for providing instructions for an erase operation, an erase verify bit EV for providing instructions for an erase verify operation, a program bit P for providing instructions for a write operation, a program verify bit PV for providing instructions for a write verify operation, a write error bit PER indicating that an error has occurred during the write operation of the flash memory, an erase error bit EER indicative of the occurrence of an error during its erase operation, a read error bit RER indicating that an error has occurred during a read operation of the flash memory, etc. The erase block designation register EBR is a register for setting erase areas of the flash memory cell array 20 every blocks and has erase block bits EB0 through EB9 every blocks. The data register FMPDR and the result register FPFR or the like are registers used for the ECC processing to be described later. Incidentally, the registers FMPDR and FPFR may use the registers of the general-purpose registers (R0 through R31).

<<Software ECC Processing on Some Areas>>

A description will next be made of an ECC function of the microcomputer 1. Although not restricted in particular, the memory cell array 20 of the flash memory 5 is roughly classified into boot areas 20A and user areas 20B as illustrated in FIG. 3(A) by way of example. Although not restricted in particular, the boot areas 20A are areas in which a user is inhibited from free rewriting through the microcomputer 1, and the user areas 20B are areas in which the free rewriting of data by the user is allowed. In short, the areas erasable by setting of the erase block bits EB0 through EB9 of the erase block designation register EBR are limited to the user areas 20 alone. A program stored in its corresponding boot area can be executed by causing a user to set a predetermined operation mode. Incidentally, while a specific example of a rewriting sequence for the flash memory is not described in detail herein, a write or programming operation under write data is carried out on condition that an erase operation has been completed in advance. If no erasing is specified by an erase block, then the write operation placed under the write data is to be not carried out either. Such write/erase control is carried out by the sequence control circuit 29.

The ECC function of the microcomputer 1 is intended for data lying within a partial area 20Ba specified in the user area 20B as illustrated in FIG. 3(B) by way of example. Namely, the ECC function corresponds to the function of increasing the number of rewrite assurances for a partial storage area (first area) 20Ba of each user area 20B as compared with the number of rewrite assurances for other storage area (second area) 20Bb in the corresponding user area 20B according to the execution of a predetermined program by the CPU 2. The ECC function based on the execution of the predetermined program is realized by a process (ECC code generating process) for generating an ECC code and adding it to write data with respect to the designated partial storage area 20Ba, and a process (ECC error determining/correcting process) for effecting an ECC code-based error determination and correction on data read from the designated partial storage area 20Ba. The former process is carried out by the execution of an ECC code generating program 21 by the CPU 2, whereas the latter process is carried out by the execution of an error-correcting program 22 by the CPU 2.

Each of the areas 20Ba is used for storage of data such as frequently-rewritten control parameters, etc. The frequently-rewritten control parameters may include information such as relative positions of respective pistons at the shut-down of an engine when, for example, the microcomputer 1 is used for car's engine control, information about fuel economy up to the instant preceding the shut-down of the engine, etc. Even if an error occurs in read data due to degradation in the characteristic of the flash memory with an increase in the number of rewritings, the error can be corrected within a range of error-correcting capability based on ECC codes if the ECC processing is effected on the frequently-rewritten data. In other words, the number of rewrite assurances can substantially be improved or increased by the ECC processing.

In FIG. 3(B), the area 20Bb is used as a storage area for fixed data such as table data, the ECC code generating program 21, the error-correcting program 22 and other user programs, etc. which are used as frequently-unrewritten information. As illustrated in FIG. 3(C) by way of example, the ECC code generating program 21 and the error-correcting program 22 are stored in the corresponding boot area 20A or may be stored in the mask ROM 8 as illustrated in FIG. 3(D) by way of example.

According to the above, since the addition and error-correction of each ECC code are performed to increase the number of rewrite assurances with only the access to the partial storage area 20Ba of each user area 20B as an object, frequently-rewritten parameter data and the like may be stored in the partial storage area 20Ba. Even if program data or the like low in rewrite frequency is stored in other storage area 20Bb, no ECC codes are added to the other storage area. Therefore, an improvement in the reliability of information stored in the flash memory, in other words, an increase in the number of rewrite assurances for the stored information can be implemented while avoiding useless usage of the storage area by substantially-needless ECC codes, as compared with a configuration in which the ECC codes are added to all the write data without distinction regardless of the storage areas.

Figures 4, 5:
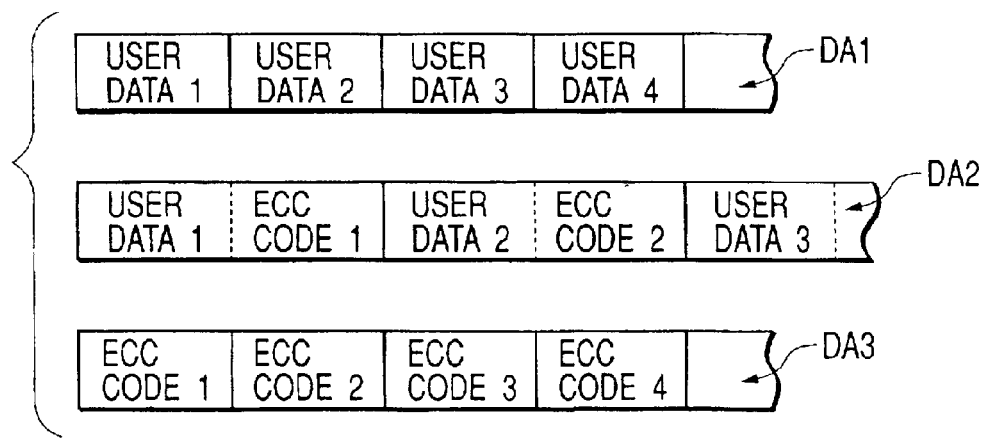
FIG. 4 is an explanatory diagram illustrating by way of example, the relationship between error correction capability and overhead, based on the number of bits of ECC codes with respect to the number of bits of user data.
FIG. 5 is an explanatory diagram illustrating by way of example, a data format in which user data and ECC codes are arranged in one array data in association with one another, and a data format in which user data and ECC codes are associated with one another as other array data.

Since the addition of the ECC codes to the write data, and the process of performing the ECC code-based error determination and correction are realized by the execution of the program by the CPU 2, an ECC method for defining the ratio of the number of bits for ECC codes to the number of bits for user data can be selected according to the described contents of the ECC code generating program and error-correcting program. Thus, the selection of an ECC method fit to or matched with a device characteristic of each memory cell in the flash memory is easy. While correcting capability becomes low as the number of bits for ECC codes with respect to the number of bits for user data decreases as illustrated in FIG. 4 by way of example, the rate (overhead) of each memory cell, which is spent or consumed by each ECC code, is less reduced. Thus, since the efficiency of error correction can easily be varied by ECC processing-based software, an error correcting method matched with device capability of a microcomputer can easily be selected. This means that waste is eliminated from the number of bits for the ECC codes, and assures the effective use of each storage area in the flash memory. To sum up, it is possible to reduce the overhead of each ECC code with respect to user data and set the use efficiency of the flash memory to maximum.

<<Provision of ECC Processing Area>>

When the partial storage area 20Ba of each of the user areas 20B is intended for ECC processing, one for providing or defining the storage area 20Ba is a user program stored in the storage area 20Bb, for example. When a parameter is stored in the storage area 20Ba, for instance, a user program specifies a source address for parameter data and a store destination address for an area 20Ba and jumps the processing of the CPU to its corresponding ECC code generating program. With the execution of the ECC code generating program, an ECC code is generated with respect to the parameter data corresponding to the source address, and ECC-added data obtained by adding the ECC code to user data used as parameter data is stored in the store destination address. When the parameter data is read, a user program specifies or designates a source address and an arbitrary destination address for the area 20Ba and jumps the processing of the CPU to an error-determining program. With the execution of the error-determining program, ECC-added data corresponding to a source address is read. Afterwards, error determination is made to the read data and necessary correction is made thereto, whereby user data defined as parameter data is set to its corresponding destination address. Upon the storage of the parameter data with the ECC processing and reading of the parameter data, the transfer of an access address and read data to be done among the user program, the ECC code generating program and the error-correcting program is performed through the general-purpose registers of the CPU 2 or the area of the RAM 3. The details thereof will be described by a specific example of the software ECC processing.

<<Correspondence between User Data and ECC Codes>>

It is desirable that in the above processing, the correspondence between the user data and the ECC codes is grasped with respect to the user program, ECC code generating program and error-correcting program on a unified basis. As illustrated in FIG. 5 by way of example, ECC codes corresponding to user data are formatted as one array data DA2 so as to be brought to one record with respect to an array DA1 of user data intended for ECC code generation. Alternatively, the ECC codes may be defined or provided as another data array DA3 with respect to the user data array DA1. It is needless to say that as a matter of course in the case of the latter, the user data array DA1 and the ECC code array DA3 need to be associated with each other in array according to their leading addresses or the like.

A procedure used or executed when user data and ECC codes are written into their corresponding area 20Ba with being associated with each other in one array data. When an array of user data to be written is designated and a process for writing data with ECC codes is specified, the user data is first read and expanded (S1). Namely, an array DA1 of user data is read into a work memory as illustrated in FIG. 6(B) by way of example. Thus, as illustrated by an array EXT in FIG. 6(*b*) by way of example, the user data read therein are expanded to a record form in which ECC code areas are provided adjacent to user data, according to a prescribed data format. Next, ECC codes are generated with respect to user data as illustrated in FIG. 6(A) by way of example and stored in their corresponding ECC code areas of record, thereby forming a record array DA2. Data in the record array DA2 is written into the corresponding area 20Ba of the flash memory (S3 through S7). As the write processing, a write pulse is applied (S4), write data is verified (S5) and a decision as to write completion based on the verify result is made (S6). If a desired write state is not reached, then rewrite data is computed and the processing from Step S4 is repeated. If the end determination in Step S6 is not satisfied even if such processing is repeated a prescribed number of times, then the write processing is ended as abnormal. If the predetermined write state in Step S6 is reached, then the write processing is ended as normal. Let's assume that the erasing of data from each write area has been finished before the application of the write pulse.

FIG. 7 illustrates by an example, a procedure used or executed when user data and ECC codes are written into their corresponding area 20Ba as other array data in association with one another. When an array of user data to be written is specified and a process for writing data with ECC codes is designated, the user data is read (S11). Namely, an array DA1 of user data is read into a work memory as illustrated in FIG. 7(B) by way of example. Next, ECC codes are generated with respect to user data as illustrated in FIG. 7(A) by way of example and stored as another data array DA3 (S12). The writing of both data arrays DA1 and DA3 into the corresponding area 20Ba of the flash memory is carried out (S13 through S17). Write processing is similar to the procedure of Steps S4 through S7 referred to above.

Figure 8:
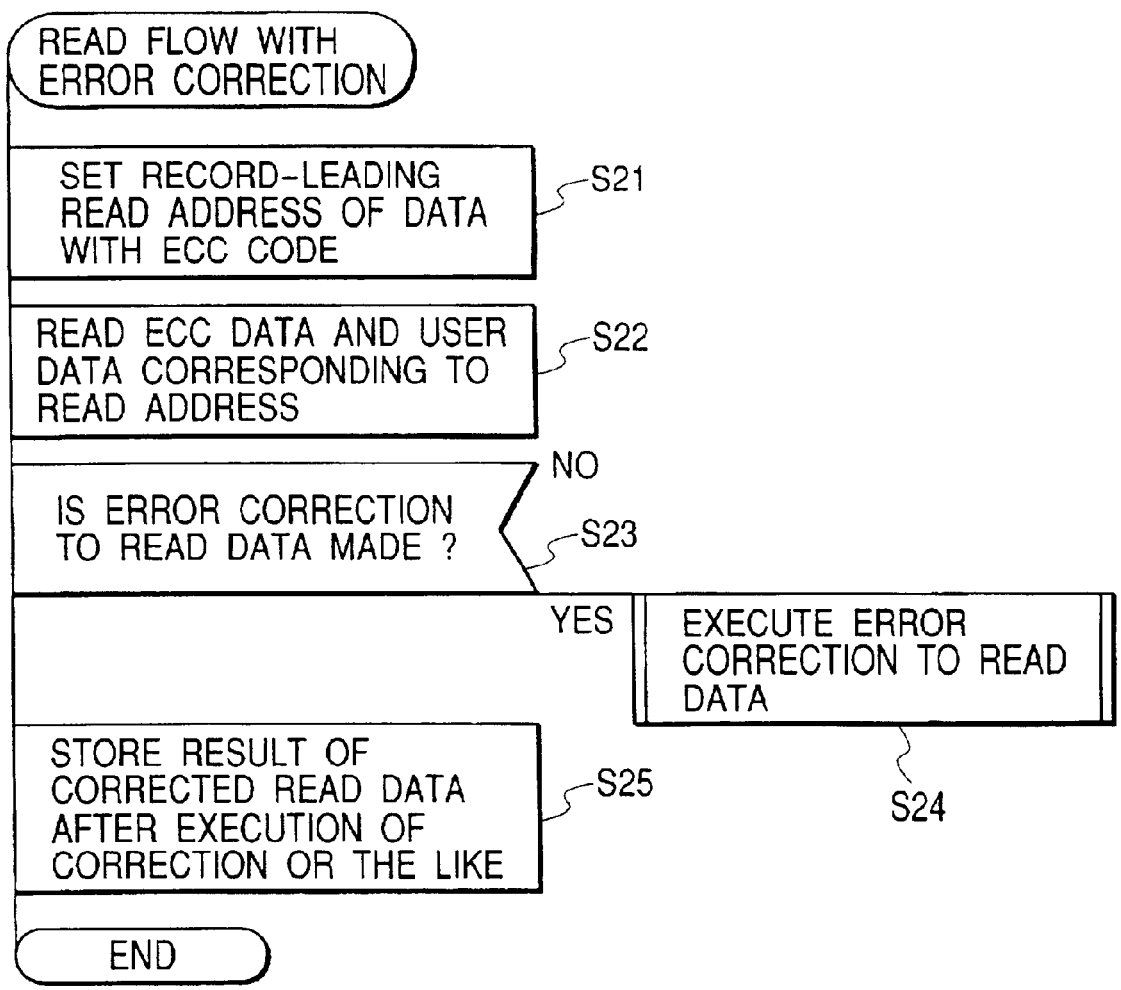
FIG. 8 is an explanatory diagram illustrating by way of example, a procedure executed when data with ECC codes, having a record array described in FIG. 6 is read.

FIG. 8 illustrates by an example, a procedure used or executed when data with ECC codes, having the record array described in FIG. 6 are read. First of all, a record leading address of each ECC code-added data to be read is set (S21). The ECC code-added data corresponding to it is read into a work memory of each area 20Ba of the flash memory (S22). Error determination is effected on the read data (S23). Since, at this time, the array data read for the purpose of the error determination as described in FIG. 6 has a predetermined format, i.e., a format having an array or arrangement in which pairs of user data and ECC codes in predetermined-number-of-bit units are set as a single record, an error-correcting program is capable of determining an error from each record by reference to the user data and ECC codes on the presumption that the array data is of its prescribed format. An error correction is executed with respect to a correctable error (S24), and the read data subjected to the necessary correction is stored in a predetermined area of the RAM 3 or the like (S25).

Figure 9:
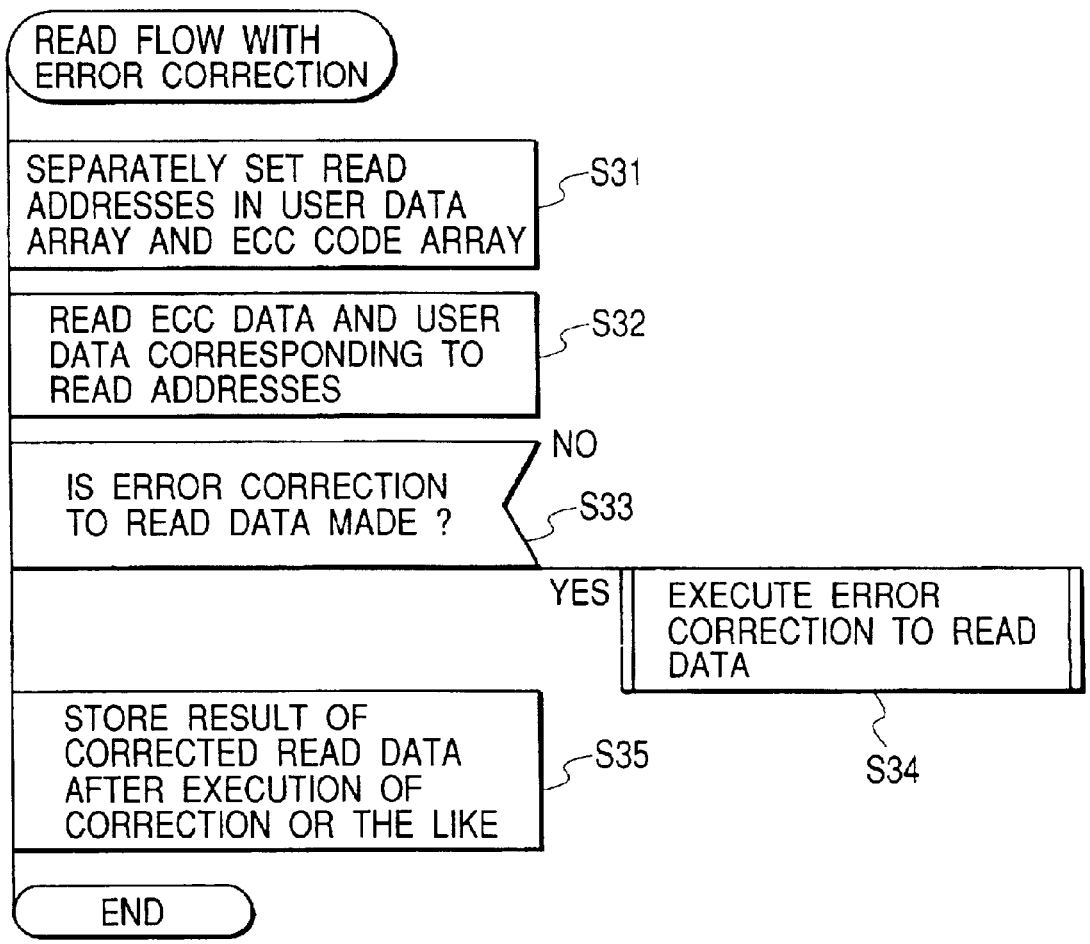
FIG. 9 is an explanatory diagram illustrating by way of example, a procedure executed when data with ECC codes in which the user data and ECC codes described in FIG. 7 are set as discrete array data is read.

FIG. 9 illustrates, as an example, a procedure executed when ECC code-added data in which the user data and ECC codes described in FIG. 7 are defined as discrete array data, are read. A leading address of the array data for the ECC codes intended for reading, and a leading address of the user data are first set (S31). An ECC code and user data corresponding to the leading addresses are read into a work memory from each area 20Ba of the flash memory (S32). Further, an error decision is made to the read data (S33). Even when reference is made to the corresponding user data and ECC codes upon the error determination, information for specifying or designating their array's structures must be given through a user program. In short, when the ECC code array data DA3 described in FIG. 7 is generated, the leading address and structure of the array data DA3 are given through the user program. Therefore, if necessary address information and information about the array's structure are not given from the user program in the same manner even when the array of the data is utilized, it cannot be utilized. An error correction is made to each correctable error (S34), and the read data subjected to the necessary correction is stored in a predetermined area of the RAM 3 or the like (S35).

If the ECC code generating program and error-correcting program are held in their corresponding user area 20B as the rewrite allowable area as described in FIG. 3(B), then the degree of freedom that a user is capable of developing these programs and writing them, can be obtained. Thus, as to the formats of the user data and ECC codes, arbitrary formats dependent on a user-created program might be convenient for the user. If consideration is given to usability of the user even where a maker for the microcomputer 1 attempts to provide or offer those ECC code generating program and error-correcting program, they may be offered based on a source program described in a high-level language such as a C language. When consideration is given to such arbitrary formats, then the addition of ECC codes and an error-correcting processing method using the data with the ECC codes may adopt the procedures described in FIGS. 7 and 9, for example.

On the other hand, let's assume that the ECC code generating program and the error-correcting program are stored in a boot area 20A used as an erase prohibition area as described in FIG. 3(C). Since the rewriting of each program temporarily stored in the boot area 20A is not possible en principe in this case, the maker for the microcomputer 1 may desirably write those programs. If done so, then the assurance of the degree of freedom with respect to a user is low even as to formats of user data and ECC codes. In reverse, the adoption of a fixed format is considered to be advisable from the viewpoint of a reduction in user's load. According to the ECC code generating program, the ECC codes are generated and thereafter the generated ECC codes and data corresponding thereto are stored in their corresponding partial storage area of the non-volatile memory as data with the ECC codes in accordance with a prescribed format. The error-correcting program may recognize the ECC code-added data according to the prescribed fixed format. When consideration is given to such a fixed format, the procedures described in FIGS. 6 and 8, for example, may be adopted as the addition of the ECC codes and an error correction processing method using the data with the ECC codes. The storage of the ECC code generating program and the error-correcting program in the mask ROM 8 described in FIG. 3(D) may also be considered alike.

<<Onboard Program Mode>>

An onboard program mode will be described. This operation mode is one example of an operation mode necessary when the ECC code generating program and the error-correcting program or the like are held or retained in their corresponding user area 20B as described in FIG. 3(B).

A procedure of an onboard program in a boot mode will first be described. A write control program, and the ECC code generating program and error-correcting program are prepared for a host device such as a personal computer or an EPROM writer or the like, which in turn is connected to a predetermined port of the I/O 11. Predetermined external terminals are respectively brought to a prescribed state to thereby transition the microcomputer 1 to a boot mode. When the microcomputer 1 is transitioned to the boot mode, the microcomputer 1 executes a boot program for a boot area and enables communications made by the SCI 12. Thus, the microcomputer 1 loads an erase program with respect to each user area 20B of the flash memory 5, and a communication control program via the SCI 12 into the RAM 3 from the boot area. Next, the loaded erase program is executed so that each user area 20B is erased over its whole surface. Further, the write control program is loaded into the RAM 3 from the host according to the communication control program. Thereafter, the write control program is executed so that the ECC code generating program and error-correcting program or the like held in the host are written into their corresponding user area 20B.

A procedure of the onboard program in a user program mode will next be described. A write/erase control program, and the ECC code generating program and error-correcting program are prepared for the host device or unit like the personal computer. Further, a transfer control program used between the user area 20B and the host device is stored in the user area 20B. First of all, the CPU 2 responds to an interruption or executes a jump instruction to thereby execute the transfer control program and hence transfers the write/erase control program to the RAM 3 from the host device. Next, the CPU 2 executes the write/erase control program on the RAM 3, erases an area necessary for the user area 20B, and writes therein the ECC code generating program and error-correcting program.

<<Improvement in ECC Processing Speed>>

Figure 10:
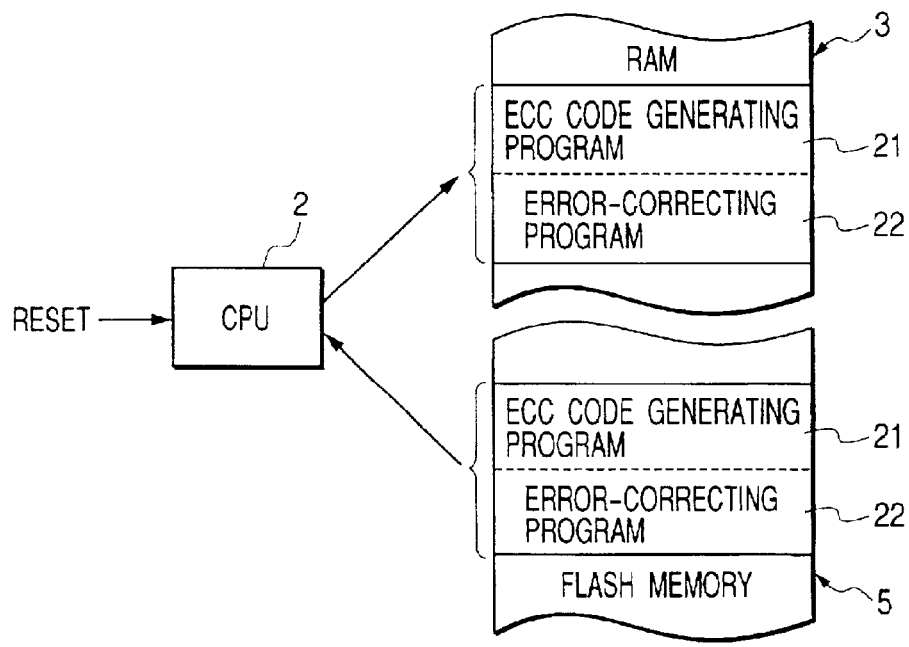
FIG. 10 is an explanatory diagram showing one example for improving the speed for executing each of ECC code generating programs and error-correcting programs.

FIG. 10 shows one example for improving or increasing the execution speed of each of the ECC code generating program and error-correcting program. Namely, the ECC code generating program and error-correcting program are transferred from the boot area 20A (see FIG. 3(C)) or user area 20B (see FIG. 3(B)) to predetermined address areas of the RAM 3. The CPU 2 may be caused to execute the ECC code generating program and error-correcting program transferred to the RAM 3. At this time, the CPU 2 may execute a transfer control program from the flash memory 5 to the RAM 3 in response to reset instructions. Such a transfer control program may be stored in a predetermined address area as, for example, a user program in a user area 20Bb or a program in a boot area 20A. According to this method, when an access cycle of the RAM 3 is faster than that of the flash memory 5, the execution speed of each of the ECC code generating program and error-correcting program by the CPU can be rendered fast.

Figure 11:
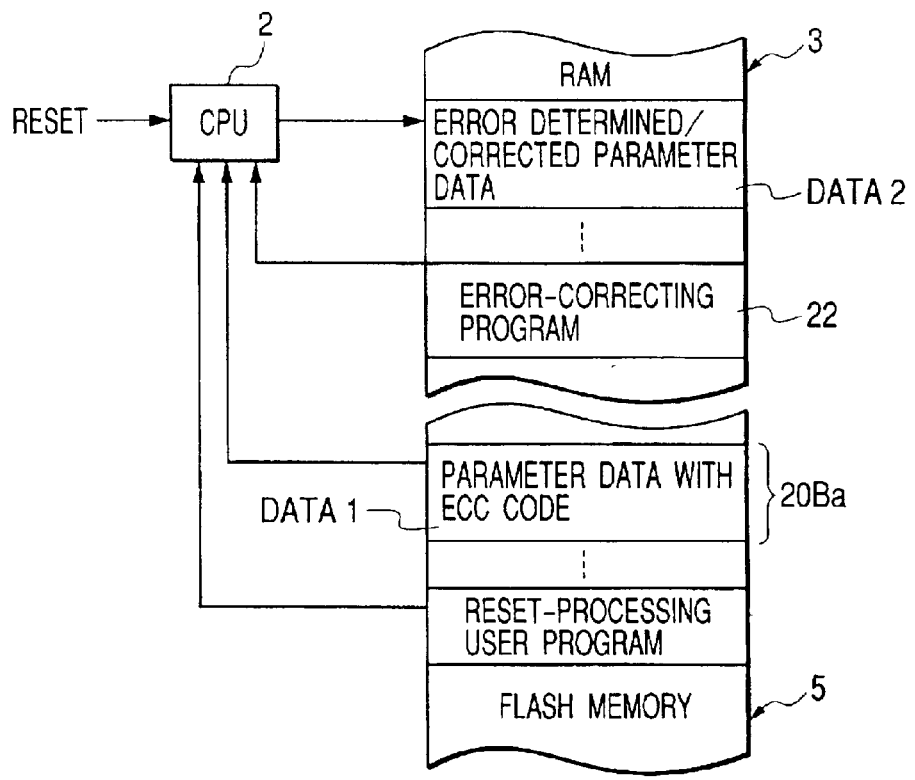
FIG. 11 is an explanatory diagram showing one example for apparently solving overhead taken by error determination.

FIG. 11 shows one example for apparently solving overhead taken by error determination. Namely, the CPU 2 executes a predetermined reset processing user program in response to a reset instruction and successively reads ECC code-added parameter data DATA1 from a partial storage area 20Ba of the flash memory 5. Thereafter, the CPU 2 effects the error determination and correction on the read ECC code-added parameter data DATA1 according to the execution of the error-correcting program, and initially stores parameter data DATA2 subjected to the error determination and correction in the RAM 3. Afterwards, the CPU 2 may read necessary data from the RAM 3 according to a control user program and needs not perform error determination in each case upon the read operation.

Incidentally, the error-correcting program 22 shown in FIG. 11 indicates a state in which it has been transferred from the predetermined address area of the flash memory 5 to the predetermined address area of the RAM 3 as shown in FIG. 10.

Figure 12:
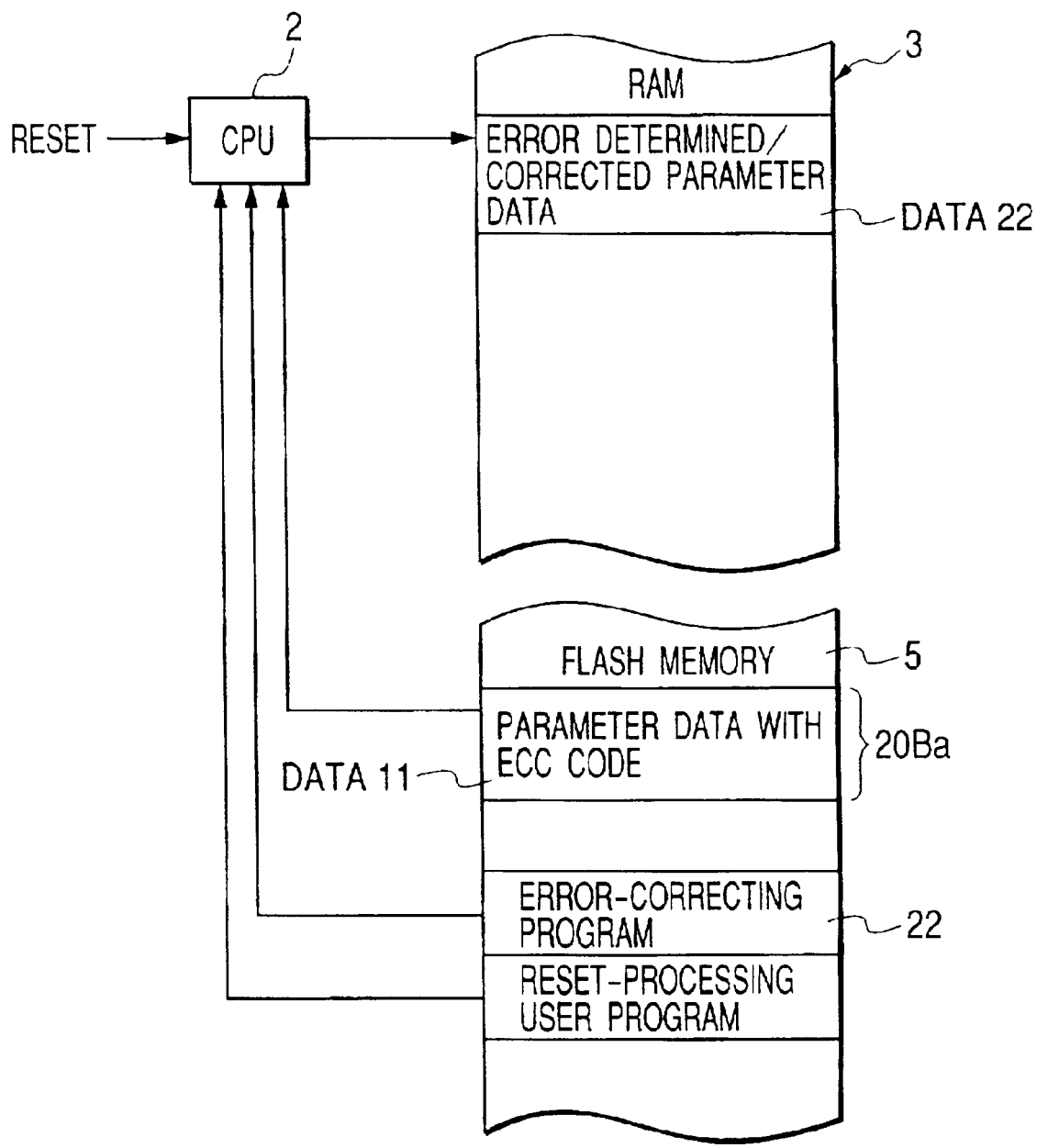
FIG. 12 is an explanatory diagram illustrating another example for apparently solving overhead taken by error determination.

FIG. 12 shows one example of a second method for apparently solving overhead taken by error determination. While FIG. 11 shows the case in which the error-correcting program 22 is executed on an address space of the RAM 3 by the CPU 2, FIG. 12 shows a method effective for a case in which a read access cycle of the RAM 3 is not faster (not shorter) than that of the flash memory 5.

When the access cycle of the flash memory 5 is identical to that of the RAM 3, the execution speed of the error-correcting program 22 by the CPU 2 is considered to substantially remain unchanged even if the error-correcting program is executed from above each storage area of the RAM 3 by the CPU 2 or the error-correcting program is executed from above each storage area of the flash memory by the CPU 2.

Thus, as shown in FIG. 12, the CPU 2 stores the error-correcting program 22 on its corresponding partial storage area of the flash memory 5 and executes it from the partial storage area of the flash memory 5 without being transferred to the RAM 3. Further, the CPU 2 effects error determination and correction on ECC code-added parameter DATA11 stored in its corresponding partial storage area 20Ba of the flash memory 5 and stores parameter data DATA22 subjected to the error determination and correction in its corresponding predetermined storage area of the RAM 3. The error-correcting program process is executed by the execution of the reset process user program stored in the partial area 20Bb of the flash memory 5 by the CPU 2 responsive to the reset.

<<Principle-based Method of Software ECC Processing>>

A principle-basis method of software ECC processing will next be explained. In the known method of performing the ECC-based coding and error correction, for example, a check matrix of hamming codes is used. Upon the error correction, a matrix operation of read data and hamming codes can be carried out by use of a sum-of-products computation or the like. In the software ECC processing in the microcomputer 1, when data is defined as n bits and ECC codes with respect to the n-bit data are defined as m bits, a matrix table in which m-bit binary numbers different from one another are arranged in an m+n sequence, is formed in the corresponding storage area 20Bb of the flash memory 5 illustrated in FIG. 3(C) by way of example. The processes of the ECC code generating program and the error-correcting program are executed by reference to the matrix table.

FIG. 13 shows one example of a matrix table 40 for one-bit correction to 16-bit data. The matrix table shown in the same drawing is illustrated with being expediently divided into a generation matrix 41 and a check matrix 42. It should be understood that in row numbers 1 through 21 and column numbers 1 through 16 in the generation matrix 41, 1 through 16 indicate numbers related to 16-bit data, and 17 through 21 indicate numbers related to 5-bit ECC codes, respectively. It should be understood that row numbers 1 through 21 in the check matrix 42 are equivalent to the generation matrix and column numbers 1 through 5 indicate numbers related to 5-bit ECC codes respectively.

Figures 15, 16, 17:
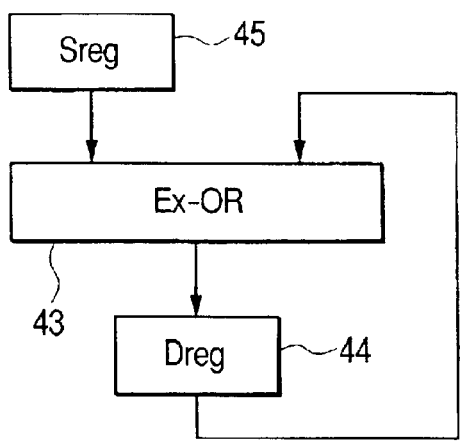
FIG. 15 is a diagram for describing a specific example for generating ECC codes with respect to 16-bit data of H'8041 by use of exclusive ORing.
FIG. 16 is a block diagram illustrating computing means for an exclusive OR operation with a configuration corresponding to an ECC code one bit as a typical one.
FIG. 17 is an explanatory diagram illustrating by way of example, ECC codes corresponding to a specific computed result exclusive-ORed in the example shown in FIG. 15.

Data with ECC codes, i.e., code words are generated as follows. For example, 5-bit ECC codes (check bits) P=p4, p3, p2, p1 and p0 are generated with respect to 16-bit data M=m15, m14, . . . , m1 and m0 to thereby generate 21-bit code words. To generate such code words, a matrix operation or computation of the generation matrix 41 and the data M may be performed. In short, a generation matrix 41 and data M are arranged as shown in FIG. 14 and rows of the generation matrix 41 in which bits of data M correspond to "1", may be added thereto. The addition made here corresponds to the addition of binary numbers. Exclusive OR (Ex-OR) calculations may be carried out every bits. Since the original 16-bit data M remain as they are in this operation method, an exclusive OR computation may be effected on portions equivalent to 5 bits of the ECC codes in the generation matrix 41. In order to generate ECC codes with respect to 16-bit data of H'8041 (b'1000_0000_0100_0001), for example, matrixes 41A obtained by extracting matrixes related to portions equivalent to 5 bits of ECC codes from the generation matrix 41 are arranged for the 16-bit data M as illustrated in FIG. 15 by way of example. Further, the values of columns in the matrix table, corresponding to bit positions of logical values "1" of data may be exclusive-ORed every bits in a row direction to generate ECC codes. FIG. 16 illustrates computing means for the exclusive-OR operation mentioned herein with a configuration of an ECC code one bit as typical. In the configuration shown in FIG. 16, a destination register (Dreg) 45 receives an output produced from a two-bit exclusive OR operator or arithmetic unit 43. An output produced from the Dreg 44 is fed back to one input of the exclusive OR operator 43, and an output produced from a source register (Sreg) 45 is supplied to the other input thereof. In the exclusive OR operation, the initial value of the Dreg 43 is given as "0", and the values of the columns in the matrix table, corresponding to the bit positions of the logical values "1" of the data are successively inputted to the Sreg 43 every bits in the row direction. The exclusive OR operator 43 latches the result of exclusive ORing of both inputs in the Dreg 44 and uses it for exclusive-ORing with the next output. Finally, the result obtained in the Dreg 44 becomes the value of a corresponding bit of each ECC code.

Incidentally, as apparent from the descriptions of FIGS. 15 and 16, the generation matrix 41 may have at least only a portion corresponding to the column numbers 17 through 21 in FIG. 14.

FIG. 17 shows the result of the exclusive OR operation in FIG. 15. An Xe-OR result shown in the same drawing corresponds to computed ECC codes. In the case of H'8041, data C=1000_0000_0100_0001, 11101 obtained by adding P=b' 11101 to M=b' 1000_0000_0100_0001 results in a 21-bit code word.

Figures 18, 19:
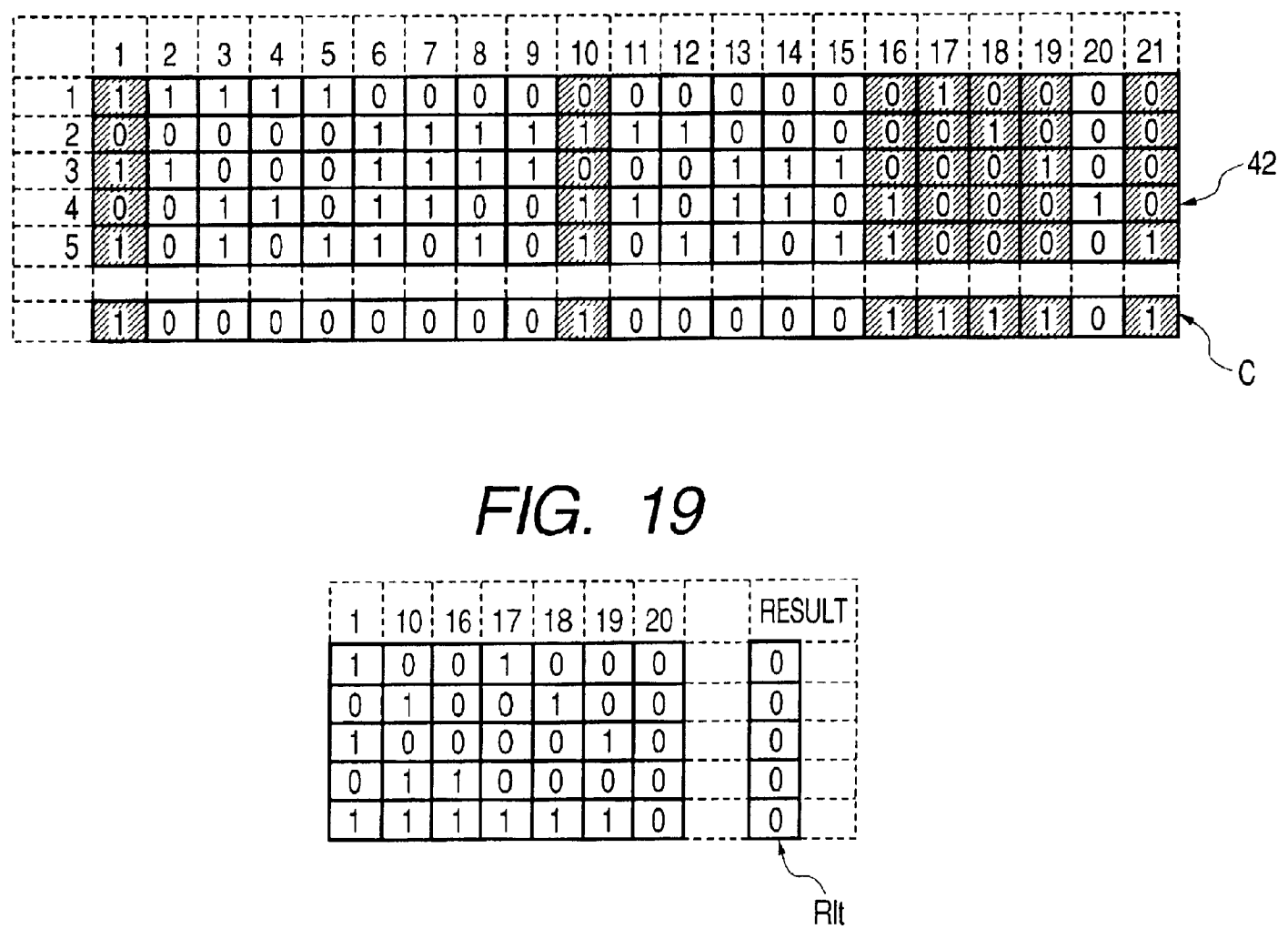

Calculating the product of the check matrix 42 and the 21-bit code word carries out error determination to each code word read from the flash memory. If one attempts to calculate the product in practice, then a matrix operation or computation based on a sum-of-products computation must be carried out. As shown in FIG. 18 by way of example herein, code words C are arranged for a check matrix 42, and the values of columns in the check matrix 42, corresponding to bit positions of logical values "1" of the code words are exclusive-ORed every bits in a row direction. The exclusive OR operation may be performed by the same method as described in FIG. 16. The example of FIG. 18 shows a case in which each code word read from the flash memory 5 is free of an error, and also illustrates a state in which the same code word as the code word C=1000_0000_0100_0001, 11101 is read.

FIG. 19 shows the result of operation by the exclusive ORing in the example shown in FIG. 18. When 5-bit values Rlt indicated in the column of the result shown in FIG. 19 are of a logical value "0" in all bits, it is determined that no error occurs, and 16-bit data M included in the code word C is defined as normal data.

Figures 20, 21:
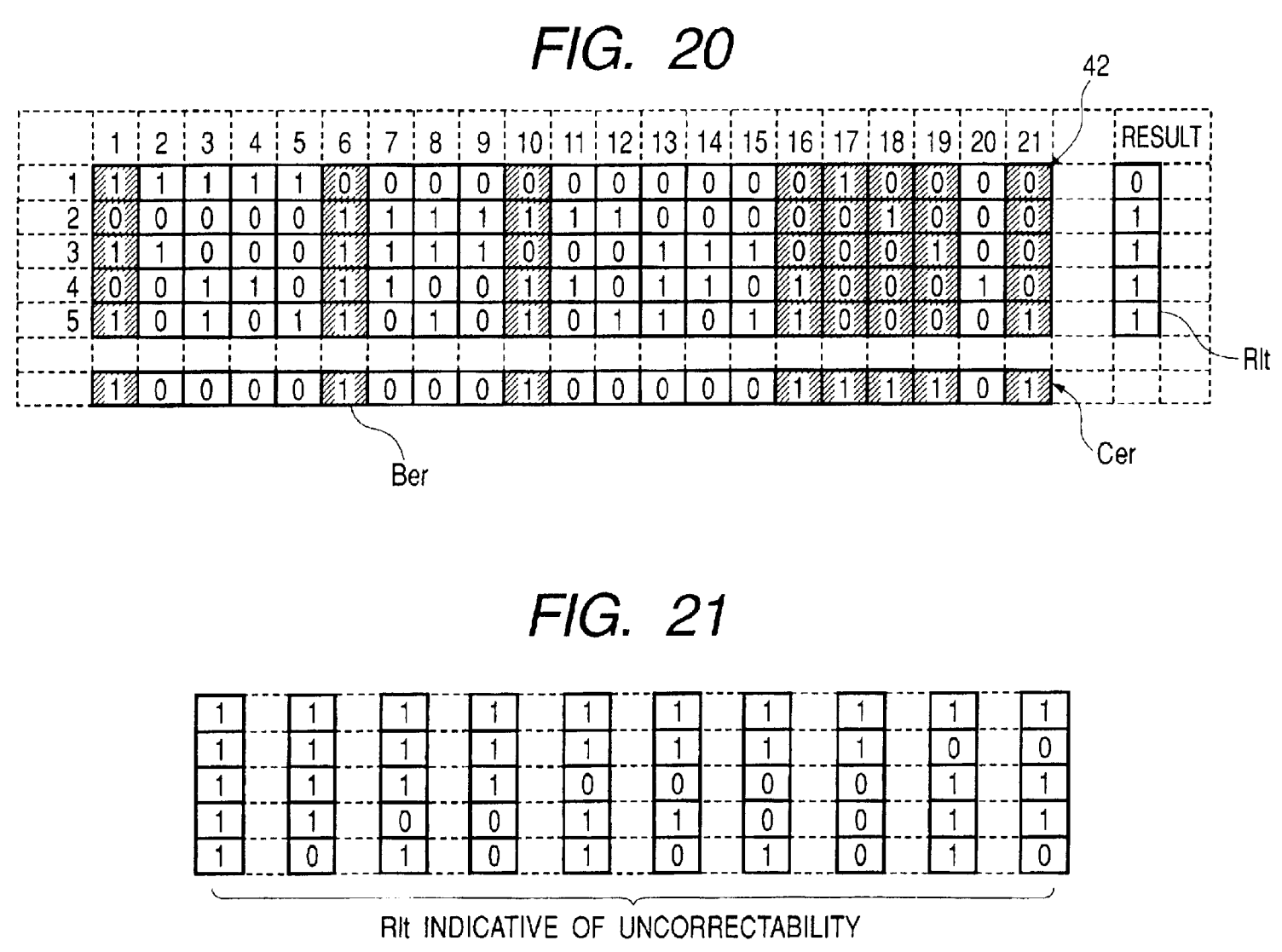

FIG. 20 illustrates, as an example, a case in which a one-bit error is included in a code word Cer read from the flash memory 5. When 5-bit values Rlt shown in the column of the result shown in FIG. 20 are of a logical value "1" even one bit, it is judged that an error has occurred. The position of an erroneous bit is a bit Ber of the code word Cer at a position corresponding to a column coincident with 5-bit binary numbers Rlt obtained by the exclusive ORing from the columns of the check matrix 42. A logical value of the error bit Ber may be inverted to make an error correction thereto. Data M of 16 bits included in the corrected code word is defined as post-correction normal data.

When a correctable error of one bit occurs as is apparent from the description of FIG. 20, an error determination-based computational result Rlt coincides with a bit pattern of any column of the check matrix 42. When bit patterns other than the above bit pattern appear in the computational result Rlt, uncorrectable errors of 2 bits or more would be produced. FIG. 21 shows ten types of bit patterns that means such uncorrectability. Since the values of the ten types of bit patterns indicative of such uncorrectability are brought to values of 22 or more in a decimal number in such an example based on the check matrix 42, a decision as to the uncorrectability is also easy.

Since the matrix computation requiring the sum-of-products computation is not directly performed in the software ECC processing described above, the CPU 2 or microcomputer 1 is capable of efficiently carrying out the software-based ECC processing even without having the sum-of-products computing unit. Since the matrix table is used, the generation matrix and check matrix may not be generated in each case.

Figure 22:
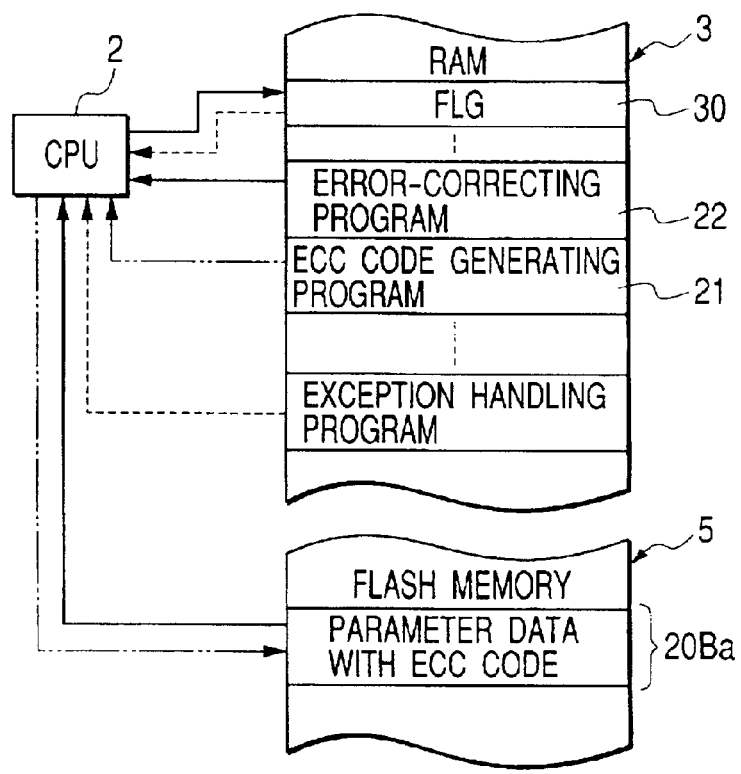
FIG. 22 is an explanatory diagram showing an example in which exception handling is made feasible to uncorrectable errors.

FIG. 22 shows an example in which exception handling is made feasible to uncorrectable errors. When an uncorrectable error occurs in the error determining process under the execution of the error-correcting program, the CPU 2 causes each flag area FLG30 (or read error bit RER of a register FMLCR in the flash control module 6) of the RAM 3 to retain or hold information indicative of the occurrence of the error uncorrectable in the error determining process placed under the execution of the error-correcting program recognizably from the outside. Reference is made to the flag areas FLG through a user program like an exception handling program every predetermined intervals. When the occurrence of an uncorrectable error is recognized, the rewriting of a data block or all data in which the uncorrectable errors have occurred, i.e., ECC codes are generated for new user data and added thereto, and thereafter the process of writing it into a predetermined area of an area 20Ba is executed.

Further, even when error-correctable data is detected according to the execution of the error-correcting program when the prevention of a malfunction due to data corruption is further put forward, the CPU 2 may cause a predetermined storage area of the RAM 3 or a predetermined general-purpose register to hold or retain information indicative of it recognizably from the outside. Such information may be utilized as warning information. Reference may regularly be made to the information area via a predetermined user program, for example. Thus, a user system is capable of instantaneously recognizing that data is on the point of damaging. Further, the user system promotes the reloading (rewriting) of the data on the point of damaging to thereby make it possible to further improve the reliability of the data. In short, it is possible to prevent the occurrence of a situation in which a data error actually occurs, before it happens.

<<Specific Example of ECC Code Generation Processing>>

Figure 23:
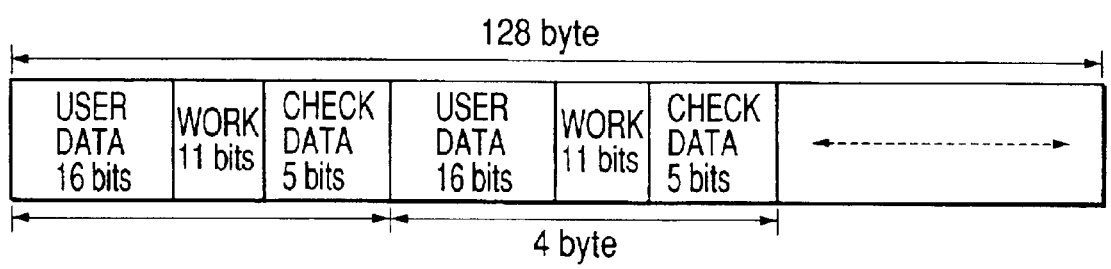
FIG. 23 is an explanatory diagram showing one example of a fixed format adopted for code words with used data and ECC codes.

A process of preparing the user data of the fixed format described in FIG. 17 to thereby generate ECC codes will now be described specifically. Before the generation of the ECC codes, the reading of user data and format expansion are carried out according to a user program, for example. The expanded data are represented as illustrated in FIG. 23 by way of example. Namely, 16-bit expansion bits are assigned to user data 16 bits, and 32 bits in total result in a code word area as one ECC data block. Each of the 16-bit expansion bits is provided with an 11-bit work bit area in addition to a 5-bit ECC code area. However, this is one which has taken into consideration such a practical viewpoint that a necessary data block can be obtained by accessing with a word boundary as a unit.

FIG. 24 shows a configuration of one ECC data block in further details. In the same drawing, a coding check bit means each ECC code. In the same drawing, function names are assigned to bit numbers of the ECC data block in association with one another. The function names D00 through D15 correspond to user names, and function names P00 through P04 correspond to ECC codes, respectively.

FIG. 25 shows an example illustrative of data (data for generation) of a matrix table. The generating data shown in the same drawing correspond to the function names. Table retrieval addresses (retrieval addresses) X through X+14 are respectively assigned to the data for generation. In short, the generating data shown in FIG. 25 are substantially equal to the check matrix 42 shown in FIG. 18. A part of the check matrix 42 corresponds to the substantial generation matrix 41A described in FIG. 15. The generating data of the function names D00 through D15 shown in FIG. 25 correspond to the bit strings of the column numbers 16 through 1 of FIG. 18, whereas the generating data of the function names P00 through P04 shown in FIG. 25 correspond to the bit strings of the column numbers 21 through 17 of FIG. 18. The table shown in FIG. 25 is also described as an ECC table (ECCTLB) for the sake of convenience.

Figure 26:
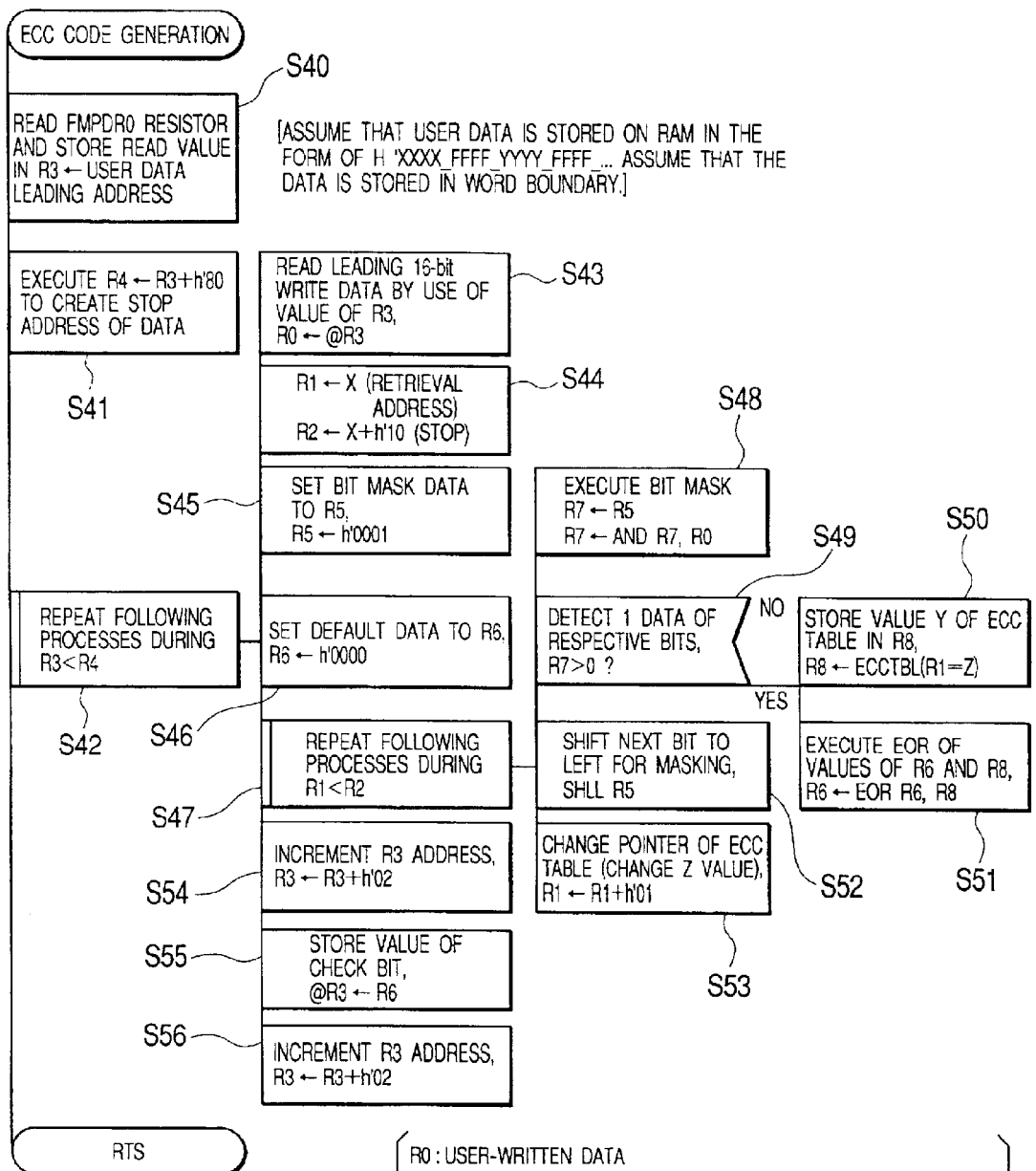
FIG. 26 is a flowchart illustrating a procedure based on an ECC code generating program by way of example.

FIG. 26 illustrates a procedure based on an ECC code generating program as an example. The general-purpose registers of the CPU 2 and the registers lying within the flash control module 6 are used for the transfer of data and addresses between the ECC code generating program and a user program executed prior to it. Namely, the user program sets a leading address of a write data area to the register FMPAR0 lying within the flash control module 6. In short, the leading address of the data expanded to the RAM 3, which has been illustrated in FIG. 23 by way of example, is set. The general-purpose register R0 is used as a user write data register, R1 is used as a matrix table retrieval address pointer, R2 is used as a matrix table retrieval stop value, R3 is used as a user written-data save address pointer, R4 is used as a user-written data save address stop value, R5 is used as data for a bit mask, R6 is used as a variable for check bit generation, R7 is used as a variable for detecting whether a bit of a logical value "1" exists, and R8 is used as a variable for storing a table value corresponding to each bit, respectively.

Referring to FIG. 26, first of all, the value of the register FMPDR0 is set to the register R3, and the leading address of the user data expanded onto the RAM 3 is stored (S40). Next, h' 80 is added to the value of the register R3, and a stop address for the user data expanded onto the RAM is stored in the register R4 (S41). The following processes are executed until the value of the register R3 reaches the value of the register R4 (S42). Namely, leading 16-bit user data is read through the use of the value of the register R3 and loaded into the register R0 (S43). A leading retrieval address X of an ECCTBL is set to the register R1, and a stop address X+h' 10 thereof is set to the register R2 (S44) Bit mask data h' 0001 is set to the register R5, and default data h' 0000 is set to the register R6 (S46). The following processes are repeated until the value of the register R1 reaches the value of the register R2 (S47). In short, the value of the register R5 is loaded into the register R7, the value of the register R7 and the value of the register R0 are ANDed, and the result of ANDing is returned to the register R7 (S48). It is determined whether the value of the register R7 is larger than 0 (S49). If the result of determination in Step S49 is found to be larger than 0, then the user data of the R0 has also a bit of a logical value "1" at a bit position equal to a bit position of a logical value "1" of the mask data R5 at this time. In such a case, generating data (Y) of the ECC table is stored in the register R8 (S50), the values of the registers R6 and R8 are exclusive-ORed, and the exclusive-ORed value is returned to the register R6. If the value of the R7 is found to be 0 in Step S49, then the value of the register R5 is shifted to the left by one bit to thereby set a mask bit position as the next bit position (S52). Further, h' 01 is added to the register R1, and a retrieval address of the ECCTBL is advanced to the next address (S53). Thereafter, the present procedure is returned to the process of Step S48 again. The processes of Steps S48 through S53 are repeated until the retrieval address of the ECCTBL reaches a stop address (S47). According to the processes executed up to now, such an ECC code P as described in FIG. 17 is held in the register R6. Next, the value of the register R3 is incremented by one word (S54). The corresponding ECC code held in the register R6 is stored in an address (each expansion area on the data format of FIG. 23, which has been expanded on the RAM 3) specified by the value of the register R3 (S55). The address of the register R3 is incremented by one word to carry out similar processing with respect to the next user data. The processes of Steps S43 through S56 referred to above are repeated until R3<R4 is reached, whereby ECC codes are added to a group of user data expanded over the RAM 3. Thereafter, the execution of the ECC code generating program is completed, and the procedure is returned to the immediately preceding user program. Although not shown in the drawing in particular, the returned user program serves so as to write the ECC code-added data expanded on the RAM 3 into the corresponding predetermined area 20Ba of the flash memory 5.

<<Specific Example of Error Determining Process>>

Figure 3:
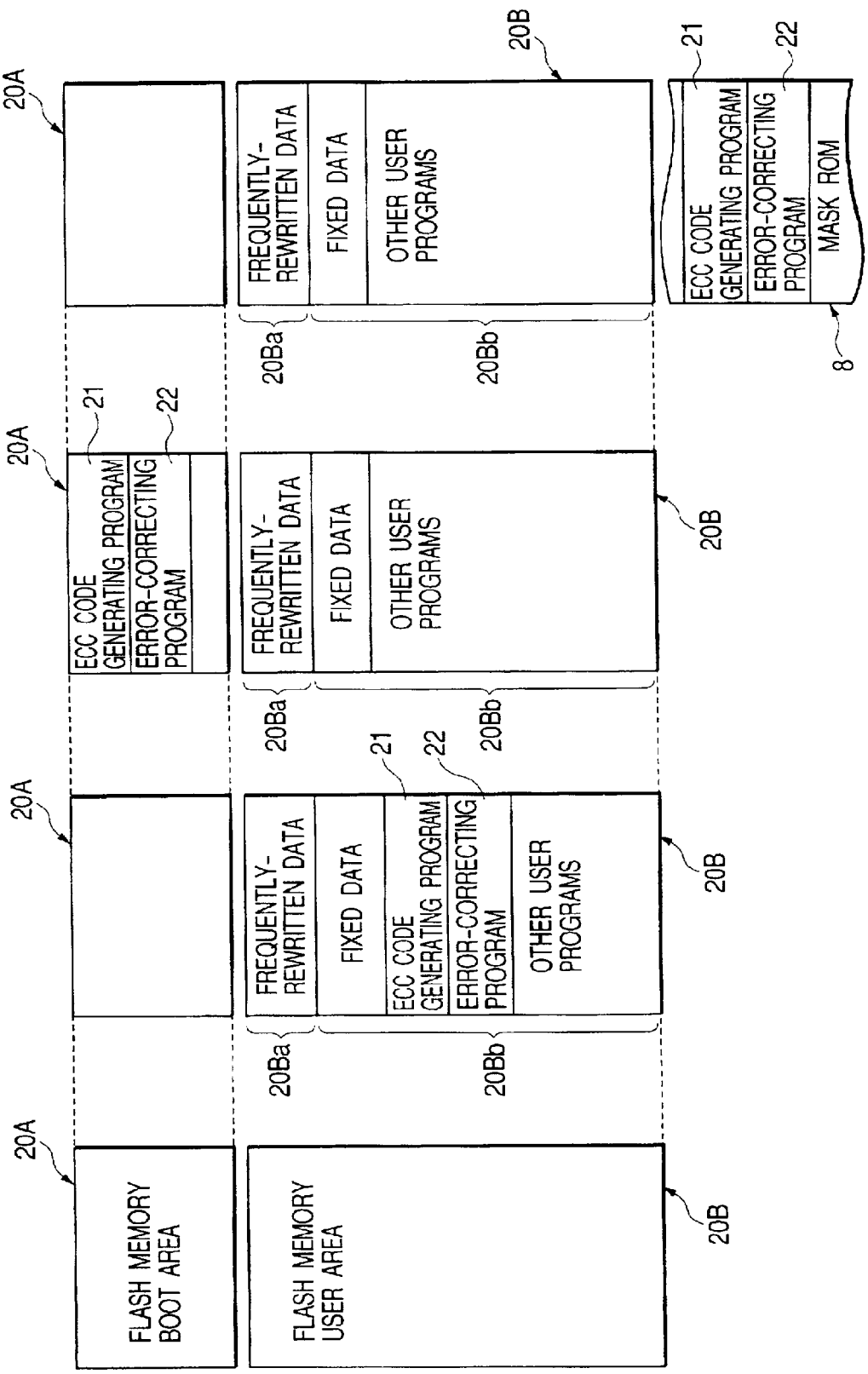
FIG. 3 is an explanatory diagram showing an example of mapping of storage areas for improving or increasing the number of rewrite assurances, and storage areas for ECC code generating programs and error-correcting programs.
Figure 27:
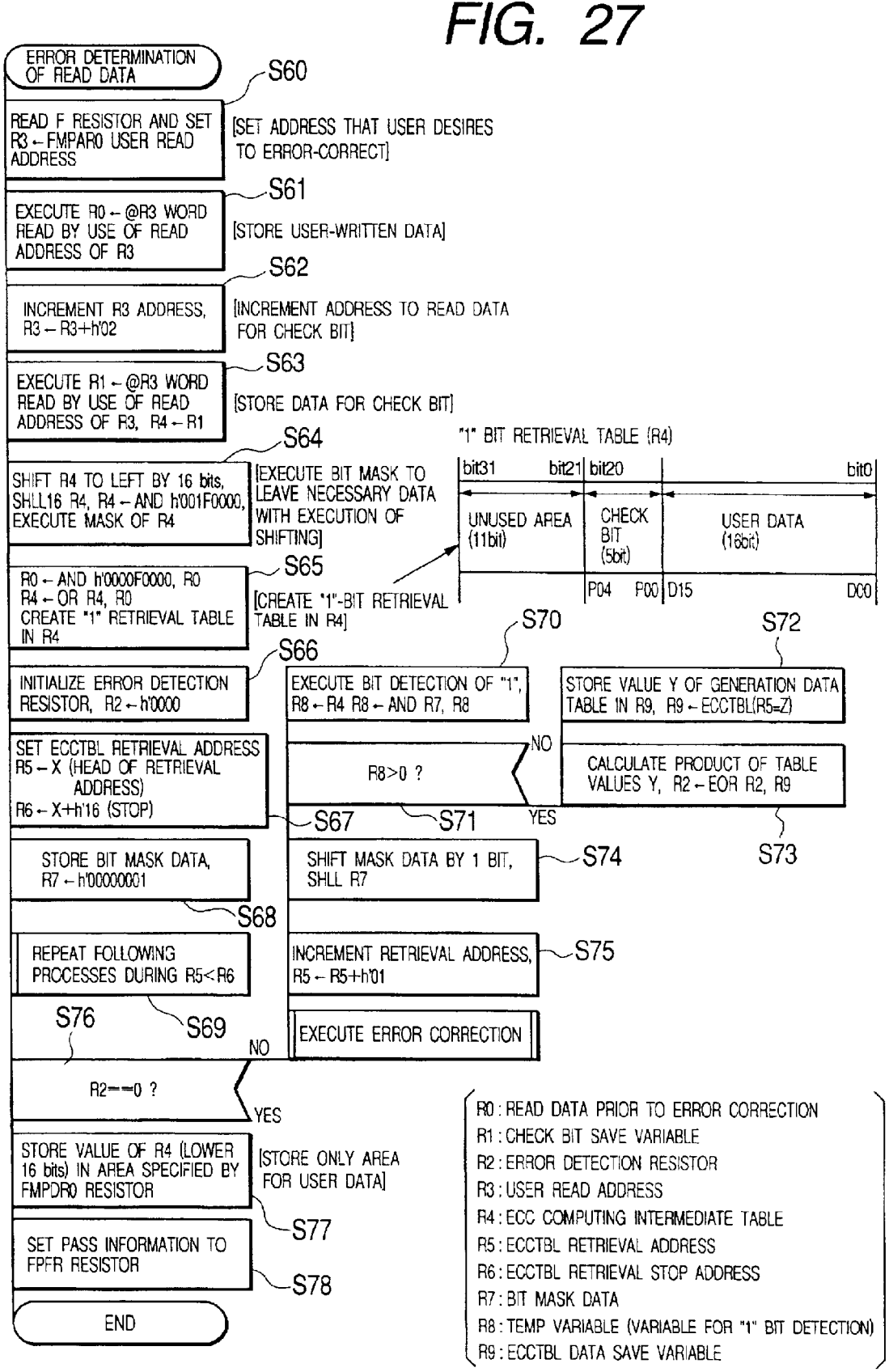
FIG. 27 is a flowchart showing the details of an error determining process executed when data with ECC codes generated according to the procedure shown in FIG. 26 are read.

FIG. 27 shows the details of an error determining process utilized when the ECC code-added data generated according to the procedure shown in FIG. 26 is read. The general-purpose registers of the CPU 2 and the registers lying within the flash control module 6 are used for the transfer of data and addresses between an error determination processing program and a user program executed prior to it. Namely, the user program sets a user read address to the register FMPAR0 lying within the flash control module 6. In short, the read address in the corresponding area 20Ba shown in FIG. 3 is set. The general-purpose register R0 is used as a pre-error correction read address, R1 is used as a check bit save or storage variable, R2 is used as a register for error detection, R3 is used as a user read address, R4 is used as an intermediate table for ECC calculation, R5 is used as an ECCTBL retrieval address, R6 is used as an ECCTBL retrieval stop address, R7 is used as a bit mask data, R8 is used as a variable for detecting a logical value "1", and R9 is used as an ECCTBL data save or storage variable, respectively.

Referring to FIG. 27, the user read address of the register FMPAR0 is first set to the register R3 (S60), and user data is stored in the register R0 by use of the read address of the register R3 (S61). Further, the address is incremented by one word (S62). Data of each subsequent ECC code is stored in the register R1, and the data of the register R1 is copied onto the register R4 (S63). The register R4 is shifted to the left by 16 bits, and h' 001F0000 is ANDed with the result of its shift. Thus, ECC codes are arranged from the 17th bit to the 21st bit in the register R4, and data in which other bits are defined as "0", are obtained (S64). Further, the ANDing of the value of the register R0 with h' 0000FFFF is done. The result of ANDing is returned to the register R0, and the value of the register R0 is added to the value of the register R4. The result of its computation is returned or fed back to the register R4 (S65). Thus, a "1"-bit retrieval table illustrated in the drawing is obtained at the register R4. An unused area in the "1"-bit retrieval table assumes a logical value "0". Next, the register R2 is initially set to the logical value "0" (S66). A retrieval address X of an ECCTBL is set to the register R5, and a retrieval stop address X+h' 16 is set to the register R6 (S67). Bit mask data h' 00000001 is set to the register R7 (S68). The following processes are repeated until the value of the R5 reaches the value of the R6. Namely, the value of the register R4 is set to the register R8, and the ANDing of the R7 and R8 is returned to the R8. It is determined whether the R8 is larger than 0 (S71). If the result of determination in Step S71 is found to be larger than 0, then coded data of the R4 has also a bit of a logical value "1" at a bit position equal to a bit position of a logical value "1" of mask data in the R7 at this time. In such a case, generating data (Y) of the ECC table ECCTBL is stored in the register R9 (S72), the values of the registers R2 and R9 are exclusive-ORed, and the exclusive-ORed value is returned to the register R2 (S73). If the value of the R8 is found to be 0 in Step S71, then the value of the register R7 is shifted to the left by one bit to thereby set a mask bit position as the next bit position (S74). Further, h' 01 is added to the register R5, and a retrieval address of the ECCTBL is advanced to the next address (S75). Thereafter, the present procedure is returned to the process of Step S70 again. The processes of Steps S70 through S77 are repeated until the retrieval address of the ECCTBL reaches a stop address (S69). According to the processes executed up to now, such a decision result Rlt as described in each of FIGS. 19 and 20 is held in the register R2. It is determined whether the value of the register R2 is "0" in all bits (S76). Since an error exists if not so, an error-correcting process to be described later is effected on a correctable one-bit error as a subroutine. Further, the values of lower 16 bits of the register R4 are stored in an area specified by the register FMPDR0 (S7), and pass information is set to the register FPFR. Incidentally, although not shown in the drawing in particular, whether or not the error is uncorrectable, is also determined in Step S76. If the error is found to be uncorrectable, then the process of notifying the occurrence of the uncorrectable error, which has been described in FIG. 22, may be executed to wait for exception handling.

<<Specific Example of Error-correcting Process>>

Figure 28:
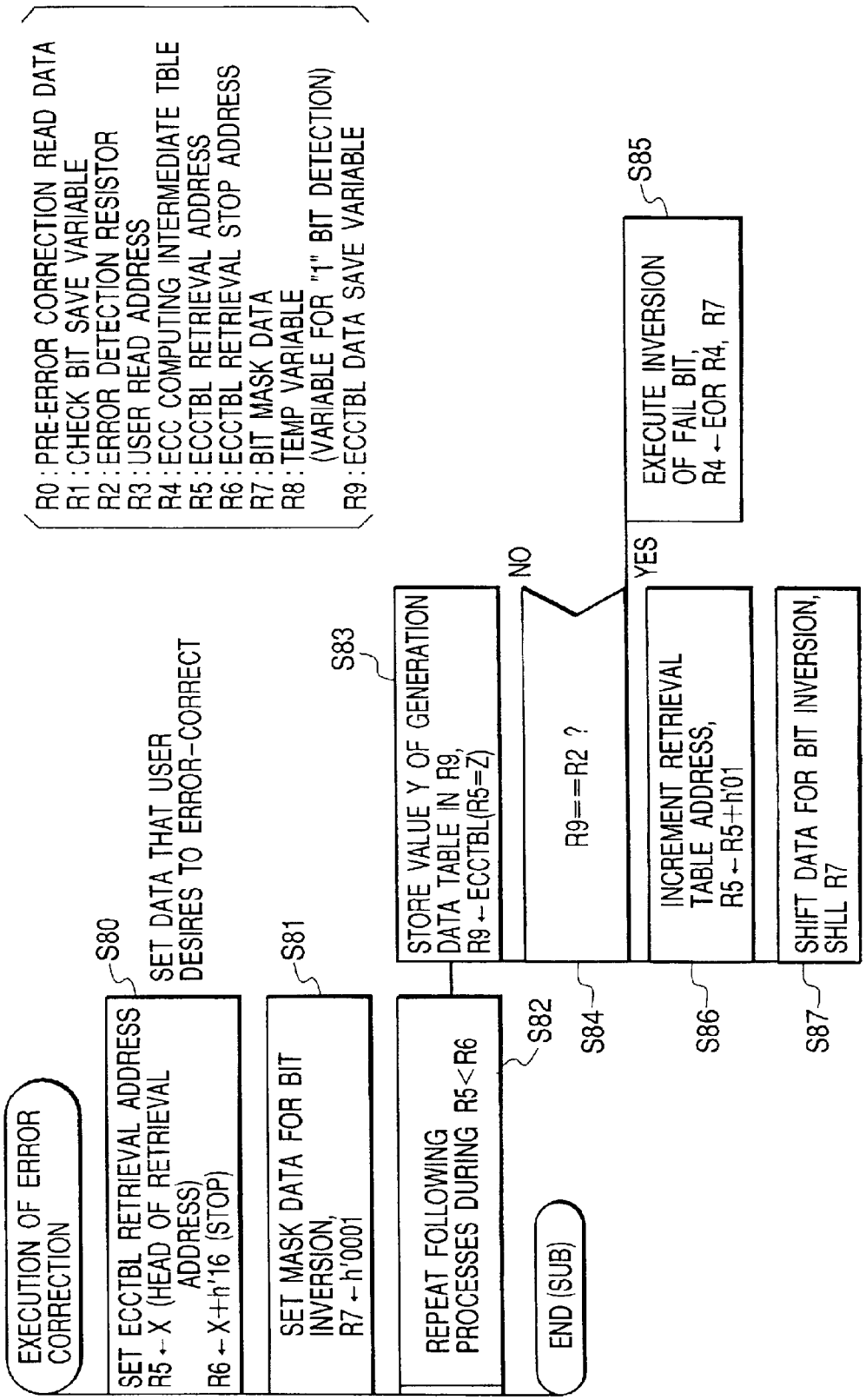
FIG. 28 is a flowchart showing the details of an error correcting process for a one-bit error.

FIG. 28 shows the details of an error-correcting process made to a one-bit error. Use forms of the general-purpose registers of the CPU 2 and the registers lying within the flash control module 6 under the use of an error correction processing program are identical to the error determining process. In FIG. 27, a leading or head retrieval address X of an ECCTBL is first set to the register R5, and a retrieval stop address of the ECCTBL is set to the register R6 (S80). Mask data h' 0001 for bit inversion is set to the register R7 (S81). The following processes are repeated until the value of the R5 reaches the value of the R6. Namely, data for generation corresponding to the retrieval address of the register R5 is stored in the register R9 from the ECCTBL. It is determined whether the value of the R9 coincides with the decision result Rlt of the register R2. If they are found to coincide with each other, then an error occurs in a bit position of user data, corresponding to a bit position of "1" in the mask data for bit inversion of the R7 at this time. As described in Step S77 of the error determining process, the lower 16 bits of the register R4 are cut out, which in turn is defined as normal user data. Therefore, the mask data of the register R7 and the data of the R4 are exclusive-ORed every corresponding bits at this time. Consequently, only each bit of user data, corresponding to the bit "1" of the mask data is inverted in logical value, and the error-corrected user data is returned to the register R4 (S85). If the value of the R9 is found not to coincide with the value of the R2 in Step S84, then h' 01 is added to the register R5 and the retrieval address of the ECCTBL is advanced to the next address (S86). Further, the mask data of the register R7 is shifted by one bit (S87), and the present procedure is returned to the process of Step S83 again. The processes of Steps S83 through S87 are repeated until the retrieval address of the ECCTBL assumes a stop address (S82), and the corresponding subroutine is terminated. When the subroutine is completed, the error-corrected normal user data is included in the register R4.

<<Data Processing System of Multi Chip>>

Figure 29:
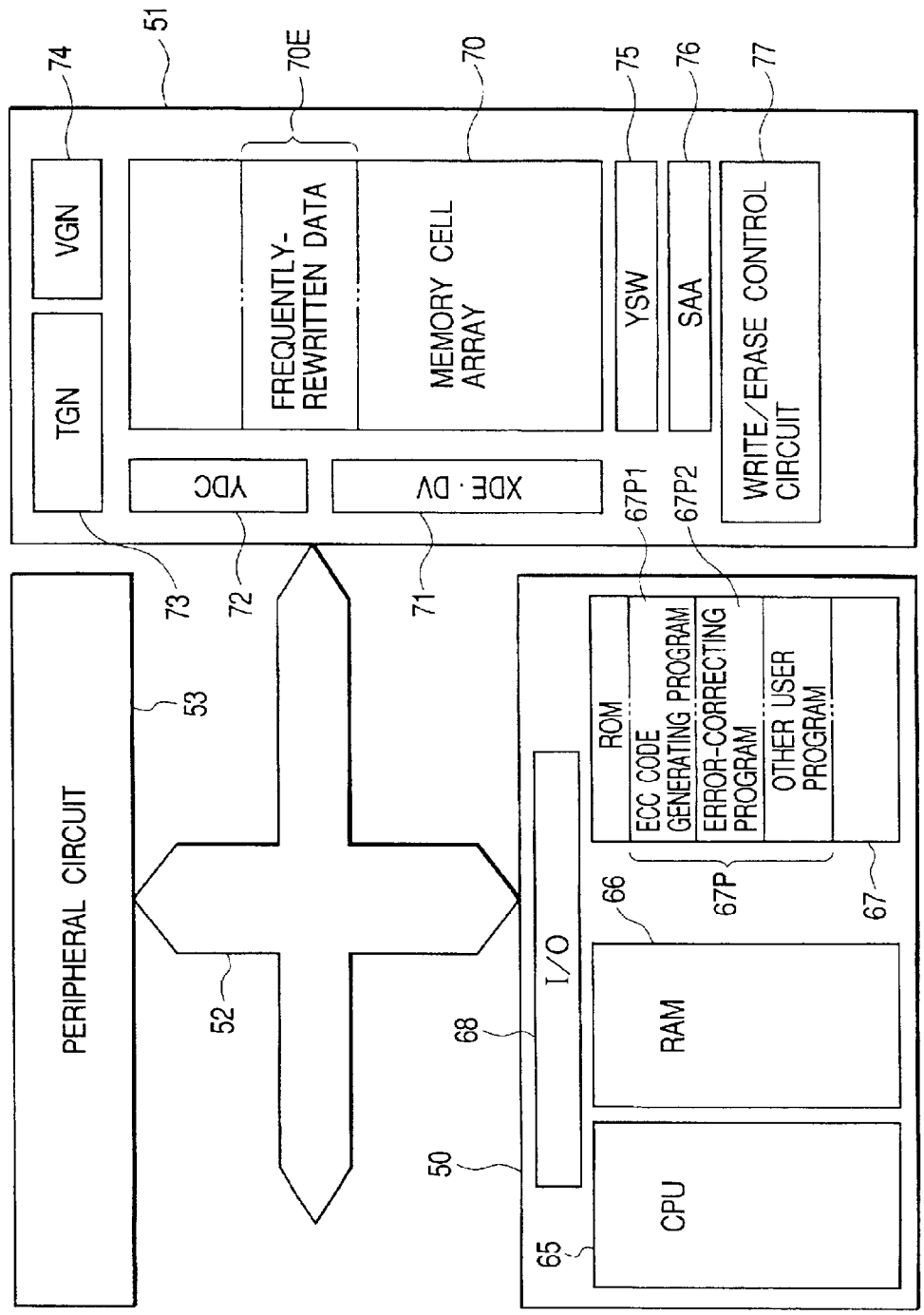
FIG. 29 is a block diagram illustrating a multi-chip data processing system by way of example.

FIG. 29 illustrates a multi-chip type data processing system as an example. In the data processing system shown in the same drawing, a data processor 50 and a flash memory 51 are respectively separately brought into semiconductor integrated circuit forms, which are connected to each other by a bus 52. In addition to the above, a peripheral circuit 53 comprised of one or plural semiconductor integrated circuits is connected to the bus 52. The data processor 50 has a CPU 65, a RAM 66, a ROM 67 and an I/O 68. The flash memory 51 is a general-purpose flash memory, which includes a memory cell array 70 with flash memory cells placed in matrix form, an XDE/DRV 71, a YDE 72, a TGN 73, a VGN 74, a YSW 75, an SAA 76, and a write/erase control circuit 77. Since the flash memory 51 is similar to the flash memory 5 in basic configuration, its detailed description will therefore be omitted. However, the flash memory 51 is provided exclusively with the write/erase control circuit 77 as a logic circuit for controlling writing and erasing. The operation of the flash memory 51 is determined according to commands and access control signals supplied from the CPU 65. The CPU 65 uses a partial storage area 70E of the flash memory 51 as an area for storing data like frequently-rewritten parameter data. In a manner similar to the above, the area 70E is intended for ECC processing to improve or increase the number of rewrite assurances as compared with other areas. The ROM 67 has a user program 67P which obtains access to the area 70E to thereby perform data processing. The user program 67P includes an ECC code generating program 67P1 executed when parameter data is written into the area 70E, and an error-correcting program 67P2 for effecting an error decision and an error correction on data with ECC codes read from the area 70E. The ECC code generating program and the error-correcting program are invoked from a predetermined user program and executed.

In a manner similar to the data processing system brought into the single-chip type microcomputer shown in FIG. 1, the above-described multi-chip type data processing system can obtain an advantageous effect in that waste of the use of each storage area by ECC codes is avoided to thereby make it possible to enhance reliability of memory information, and waste of the utilization of each storage area by ECC codes is avoided to thereby make it possible to increase the number of assurances for rewriting memory information, and an ECC method matched with a device characteristic is selected to reduce overhead of each ECC code with respect to data, thereby making it possible to set the use efficiency of each storage area to maximum.

<<Consideration Given to Multi-valued Flash Memory>>

Figure 30:
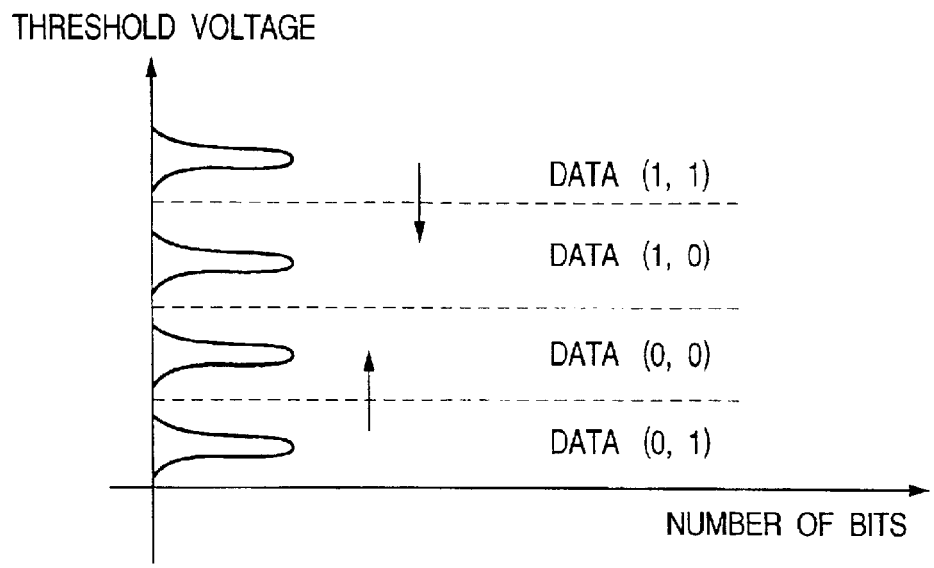
FIG. 30 is an explanatory diagram illustrating by an example, the relationship between four-value data and a threshold voltage employed in a multi-value flash memory.

The flash memories 5 and 51 may be a multi-valued flash memory capable of causing one flash memory cell to hold or retain memory information of two or more bits therein. Namely, the one flash memory cell is a memory wherein information stored in one flash memory cell is brought into plural-bit form, which is set to one of four or more types of threshold voltages specified by write data of plural bits upon information storage and outputs the state of each threshold voltage as its corresponding memory information of plural bits. Two-bit information can be written into one flash memory cell herein, and a flash memory capable of reading the information is illustrated as one example. In a multi-valued information storage technology attempt to implement such a flash memory, the state of storage of information in one memory cell is set to one selected from, for example, an erase state ("11"), a first programming or write state ("10"), a second programming or write state ("00"), and a third programming or write state ("01"). The information storage states represented as the four types in all are defined as states determined by two-bit data. Namely, the two-bit data is stored in one memory cell. A threshold voltage distribution map shown in FIG. 30 represents the relationship between the data of the four values and the threshold voltage. When the relationship between the values of the data stored in the flash memory cell and the threshold voltage is defined as shown in FIG. 30, data about the corresponding threshold voltage and data about its adjacent threshold voltage are different from each other by one bit after the storage of information therein even if the corresponding threshold voltage undesirably changes. Accordingly, even if a data error occurs, it would virtually result in one bit error. It is also possible to highly maintain the reliability of data based on ECC processing capable of performing a correction to one bit error. In other words, if a data hamming distance is brought to 1 at a location where the threshold voltages of the multi-valued flash memory are close to each other, then high reliability can be obtained with ECC codes given in the relatively reduced number of bits, and an increase in the number of rewrite assurances is facilitated.

While the invention made above by the present inventors has been described specifically by the illustrated embodiments, the present invention is not limited to them. It is needless to say that various changes can be made thereto within the scope not departing from the substance thereof.

For instance, the flash memory cell is not limited to a structure wherein a floating gate and a control gate are vertically stacked on each other, and may adopt, e.g., such a device structure or the like that a gate electrode of a MOS transistor is formed as a floating gate electrode, and a channel region is used for a control gate through a MOS gate capacitance formed by extending the gate electrode. The non-volatile storage element is not limited to the flash memory and may be a non-volatile memory like an EEPROM (Electrically Erasable and Programmable Read-Only Memory) wherein an MNOS (Metal Nitride Oxide Semiconductor) transistor is formed as a storage element, or a dielectric memory or the like.

The data processing system can be implemented as a single-chip type microcomputer wherein the non-volatile memory and central processing unit are formed on a single semiconductor chip. On the other hand, as described above, the data processing system may be implemented in a multi-chip form wherein the non-volatile memory and central processing unit are respectively formed on discrete semiconductor chips. Further, the data processing system is not limited to the single-chip type and multi-chip type microcomputers and can widely be applied to a graphics controller with a flash memory built therein, a system LSI mixed with a DRAM together with a dedicated logic circuit, and other multichip-based electronic circuit.

Advantageous effects obtained by a typical one of the inventions disclosed in the first embodiment will be explained in brief as follows:

ECC codes are added to only a partial storage area and an error correction is made thereto to thereby increase the number of rewrite assurances. Therefore, the substantially needless waste of each storage area by ECC codes can be avoided as compared with a configuration in which the ECC codes are added to all the write data without distinction regardless of the storage areas. Further, since software copes with ECC processing, ECC correcting capability matched with a device characteristic of a non-volatile memory can easily be selected. Thus, the data processing system is capable of avoiding waste of the utilization of each storage area by the ECC codes to thereby enhance the reliability of information stored in the non-volatile memory. Further, the data processing system avoids waste of the utilization of each storage area by the ECC codes to thereby make it possible to increase the number of assurances for rewriting information stored in the non-volatile memory. Furthermore, an ECC method matched with a device characteristic can be selected and hence overhead of each ECC code with respect to data is reduced, thereby making it possible to set the use efficiency of each storage area to maximum.

It is possible to restrain a delay in data read operation due to the effecting of an error determining and correcting process on data with ECC codes.

The generation of ECC codes can efficiently be carried out without execution of a sum-of-products computation. An error decision as to data with ECC codes can be carried out with efficiency.

Figure 31:
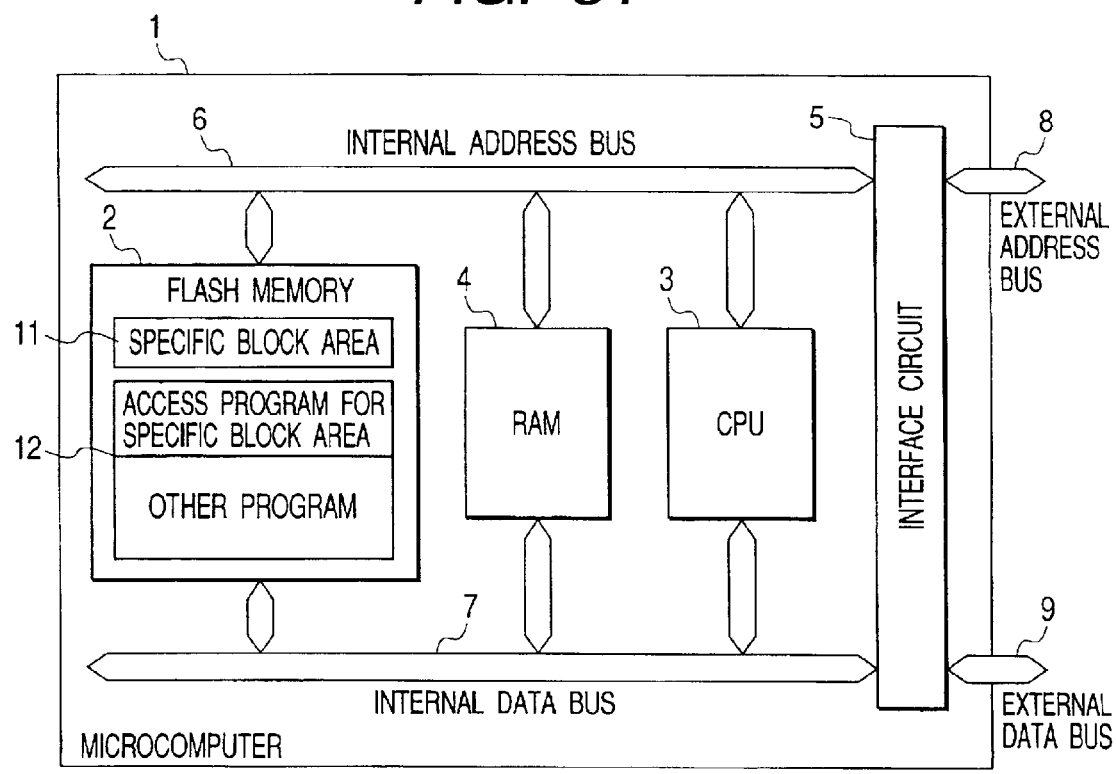
FIG. 31 is a block diagram showing a microcomputer corresponding to one example of a data processing system according to the present invention.

Second Embodiment:

FIG. 31 shows a microcomputer corresponding to one example of a data processing system according to the present invention. The microcomputer 1 shown in the same drawing includes a flash memory 2 showing one example of an erasable and programmable non-volatile storage device, a CPU 3, a RAM (Random Access Memory) 4 and an interface circuit 5. They are connected to one another by an internal address bus 6, an internal data bus 7 and an unillustrated control data bus. The interface circuit 5 is connectable to an unillustrated peripheral circuit or the like via an external data bus 9 and an unillustrated external control bus. The microcomputer 1 shown in the same drawing is formed on a single semiconductor substrate or semiconductor chip such as monocrystal silicon or the like by, for example, a CMOS integrated circuit manufacturing technology.

Although not shown in the drawing in particular, the CPU 3 has an instruction controller and an arithmetic unit. The instruction controller fetches an instruction, decodes the fetched instruction, and generates a control signal according to the result of decoding. The arithmetic unit executes an address operation and a data operation or the like for implementing or realizing instructions based on the fetched instruction, on the basis of the control signal. The RAM 4 is used in a work area or a data temporary storage area of the CPU 3. An instruction set of the CPU 3 includes a data transfer instruction, a logical operation instruction, an arithmetic operation instruction, a bit manipulation instruction, a branch instruction, etc. As the logical operation instruction, may generally be mentioned, an instruction for performing logical operations such as AND, OR, exclusive-OR or the like.

Although not restricted in particular, the flash memory 2 has a specific block area 11 used as a first area in which frequent rewriting is to be scheduled, and a program area 12 used as a second area in which frequent rewriting is not to be scheduled, both of which are defined as non-volatile storage areas in which non-volatile memory cells are placed in matrix form. For example, a program used for access to the specific block area 11, and other programs are stored in the program area 12. While the specific block area 11 and the program area 12 are illustrated in FIG. 31 so as to be physically separated from each other, they may be disposed within the same memory array.

Figure 32:
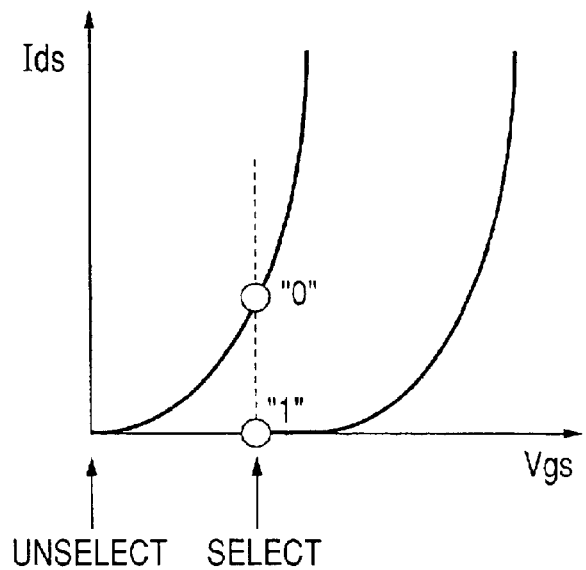
FIG. 32 is a characteristic diagram illustrating by an example, an Ids-Vgs characteristic of a non-volatile memory cell placed in a non-volatile storage area.

FIG. 32 illustrates an Ids-Vgs characteristic of each of the non-volatile memory cells disposed in the non-volatile storage areas, as an example. In the present example, the memory cells, which hold logical value "0" and "1", are respectively brought into a low threshold state and a high threshold state. Thus, when a suitable voltage is applied (selected) between the gates and sources of the memory cells, the drains-to-sources of the memory cells holding the logical values "0" and "1" are respectively brought into conduction and non-conduction, whereby data corresponding to memory information can be read out.

Figure 33:
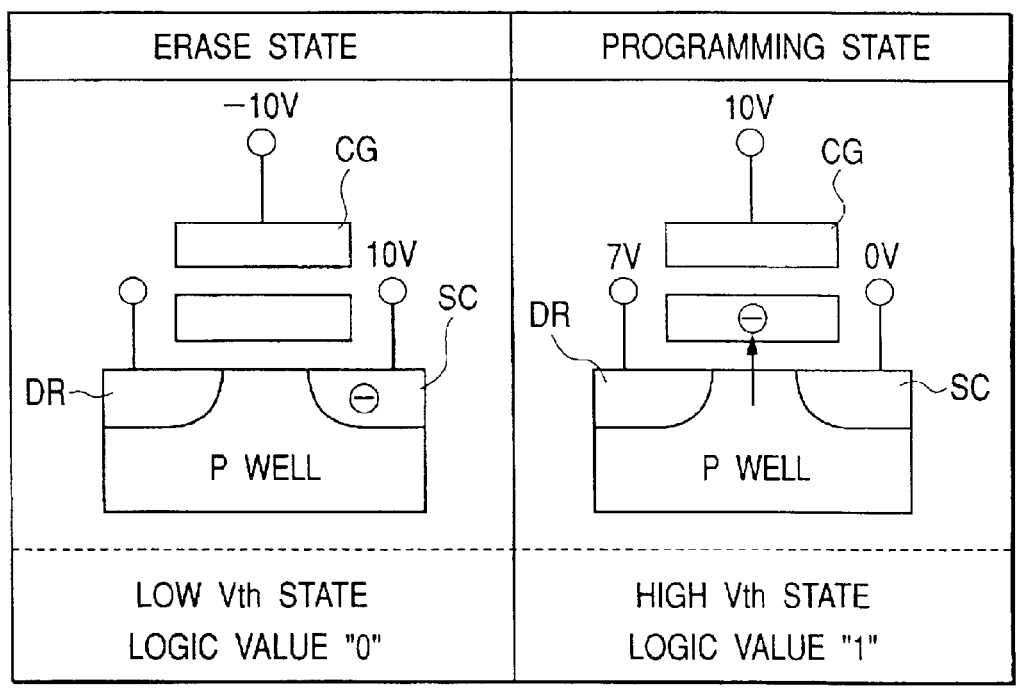
FIG. 33 is an explanatory diagram illustrating by way of example, a structure of a non-volatile memory cell for creating a low threshold state and a high threshold state shown in 32, and erase and programming states thereof.

FIG. 33 illustrates by an example, a structure of a non-volatile memory cell for creating such low and high threshold states as shown in FIG. 32, and a programming state and an erase state thereof. Although not restricted in particular, a state ("1" state) in which a threshold voltage of the non-volatile memory cell is high, is defined as a programming (write) state, and a state ("0" state) in which the threshold voltage thereof is low, is defined as an erase (clear) state.

Each of the non-volatile memory cells is formed as an n channel type and is configured by providing a floating gate FG on a channel forming region lying between a source SC and a drain DR formed in a P well (P-type well region) PW with an oxide film interposed therebetween, and laminating a control gate CG on the floating gate FG with a gate insulator interposed therebetween.

The erase state is achieved by, for example, applying a high positive voltage (10V) to the source SC, applying a high negative voltage (−10V) to the control gate CG and extracting electrons from the floating gate FG to the source SC. The programming state is achieved by, for example, applying a positive voltage (7V) to the drain DR, applying a circuit's ground voltage (0V) to the source SC, applying a high positive voltage (10V) to the control gate CG, causing a current to flow between the drain and source, and storing hot electrons caused thereby in the floating gate FG.

Figure 34:
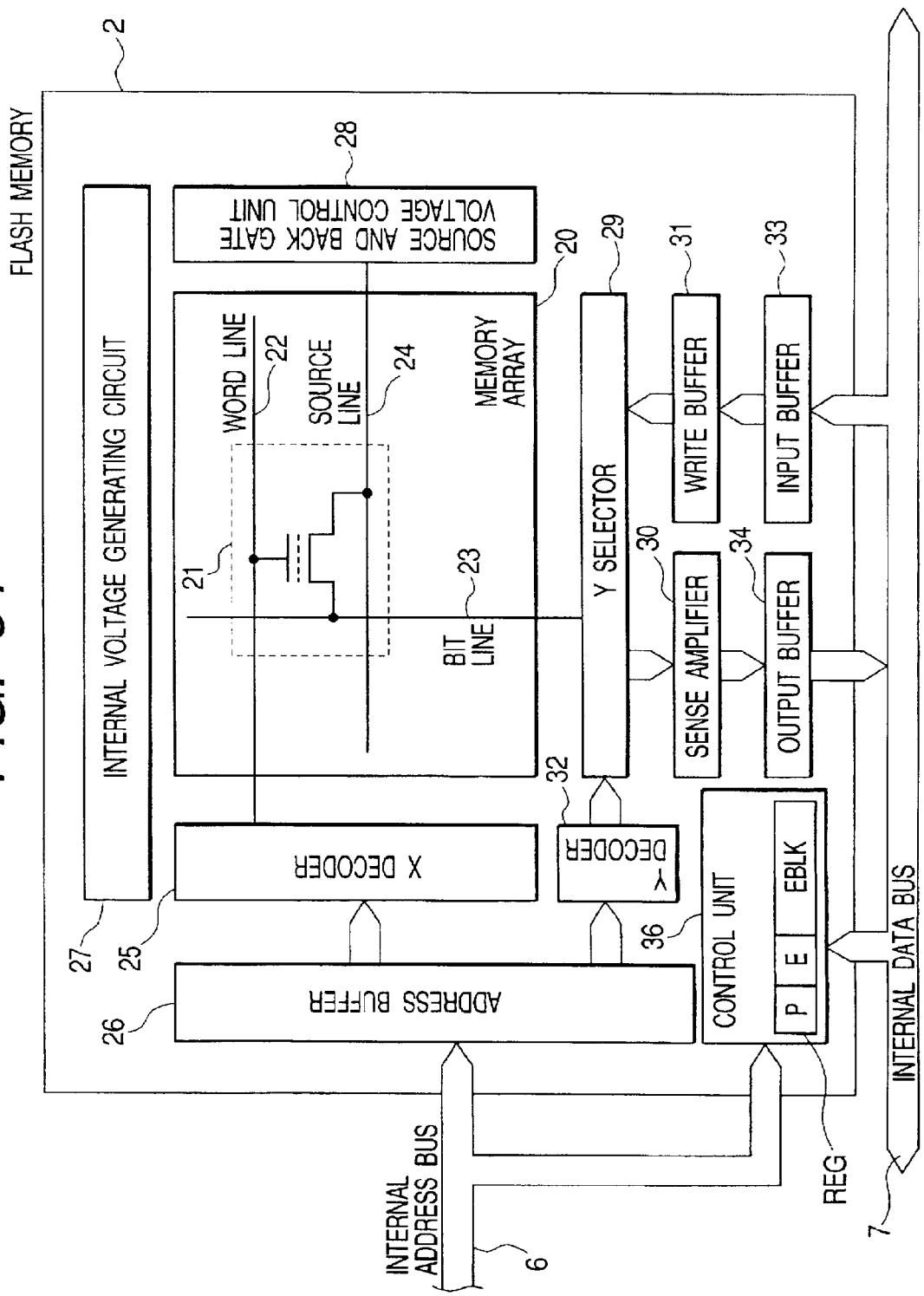
FIG. 34 is a block diagram showing one example of a flash memory.

FIG. 34 shows one example of the flash memory. In the same drawing, a typically-shown non-volatile memory cell 21 is matrix-arranged in a memory array 20 in large numbers. A control gate (CG) of each non-volatile memory cell is connected to a word line 22, a drain (DR) thereof is connected to a bit line 23, and a source (SC) thereof is connected to a source line 24, respectively. Although omitted in the drawing, the word line 22, bit line 23 and source line 24 are arranged in large numbers in a matrix direction of the memory cells 21.

An X decoder 25 decodes an X address supplied to an address buffer 26 and selectively drives the word lines 22. A voltage for driving the selected word line 22 is determined by an operating source voltage supplied from an internal voltage generating circuit 27 according to operation modes of the flash memory, for reading and writing or the like. A source and back gate voltage control unit 28 selectively controls voltages supplied to the source line 24 and a well region of each non-volatile memory cell 21. A voltage supplied to each of the source line 22 and the well region is determined by an operating source voltage supplied from the internal voltage generating circuit 27 according to the operation modes of the flash memory. The corresponding bit line 23 is selected by a Y decoder 29 and connected to a sense amplifier 30 or a write buffer 31. A Y decoder 32 decodes a Y address supplied to the address buffer 26 to thereby generate a select control signal for the Y selector 29. The write buffer 31 latches write data via an input buffer 33 and drives the corresponding bit line 23 to change the memory cell 21 held in an erase state to a programming state. A bit line drive voltage is determined according to an operating source voltage supplied from the internal voltage generating circuit 27 according to the operation mode. The sense amplifier 30 amplifies a read signal read into the corresponding bit line form the memory cell according to a verify operation at a read or write operation. The amplified read signal is outputted from an output buffer 34 to the internal data bus 7 as read data.

A control unit 36 controls an internal operation of the flash memory 2 in response to access instructions issued from the CPU 3. When instructions for a read operation is issued from the CPU 3, the control unit 36 causes the X decoder 25 and Y decoder 32 to decode addresses supplied from the internal address bus 6 to thereby select the corresponding word line 21 and bit line 23, whereby a memory cell corresponding to an access address is selected. Upon the read operation, the control unit 36 activates the sense amplifier 30 and the output buffer 34 to thereby cause an internal data bus 7 to output read data.

The control unit 36 has a control register REG for the write operation and performs the write operation according to the state of setting of a control register REG. The control register REG has control bits such as a program bit P, an erase bit E, etc. and also includes a specified area EBLK of an erase block (erase area). In the present example, the erasing is one in which a memory cell group sharing the use of a source line is defined as a minimum unit. The designation of each erase block is performed by designating or specifying a block to be erased from a plurality of blocks which respectively share the use of the source line. A minimum unit for rewriting data is defined as an erase block unit. When the erase bit E is enabled, an erase voltage used for the erase state is applied to its corresponding memory cell of a block specified by the erase block specified area EBLK. The application of the erase voltage thereto is carried out plural times in parts, and whether a prescribed threshold voltage is reached in each case, is verified. When the prescribed threshold voltage is reached, the operation for the erase state is completed. When the program bit P is enabled, the application of a program voltage for the programming state to each memory cell intended for the write operation, which is specified by an address, and the inhibition of the application of the program voltage thereto are controlled according to logical values of respective bits for write data. The application of the program voltage is carried out plural times in parts, and whether or not a prescribed threshold voltage is reached, is verified in each case. When the prescribed threshold voltage is reached, the operation for the programming state is terminated.

A description will next be made of write and read operations for enhancing the reliability of the storage of information in the specific block area 11 in which rewriting or programming is frequently carried out. The CPU 3 stores one data in memory cells at different addresses when the information is written into the specific block area 11, and reads data from the memory cells at the different addresses upon reading the data from the specific block area 11. Further, the CPU 3 performs a logical operation on the read plural data and effects necessary error corrections thereon. On the other hand, the CPU 3 obtains a conventional flash memory access to the program area 12 and does not carry out a process for overlapping writing of one data into other addresses, and a necessary error correction based on duplicate or overlapped data read from the corresponding other addresses.

Figure 35:
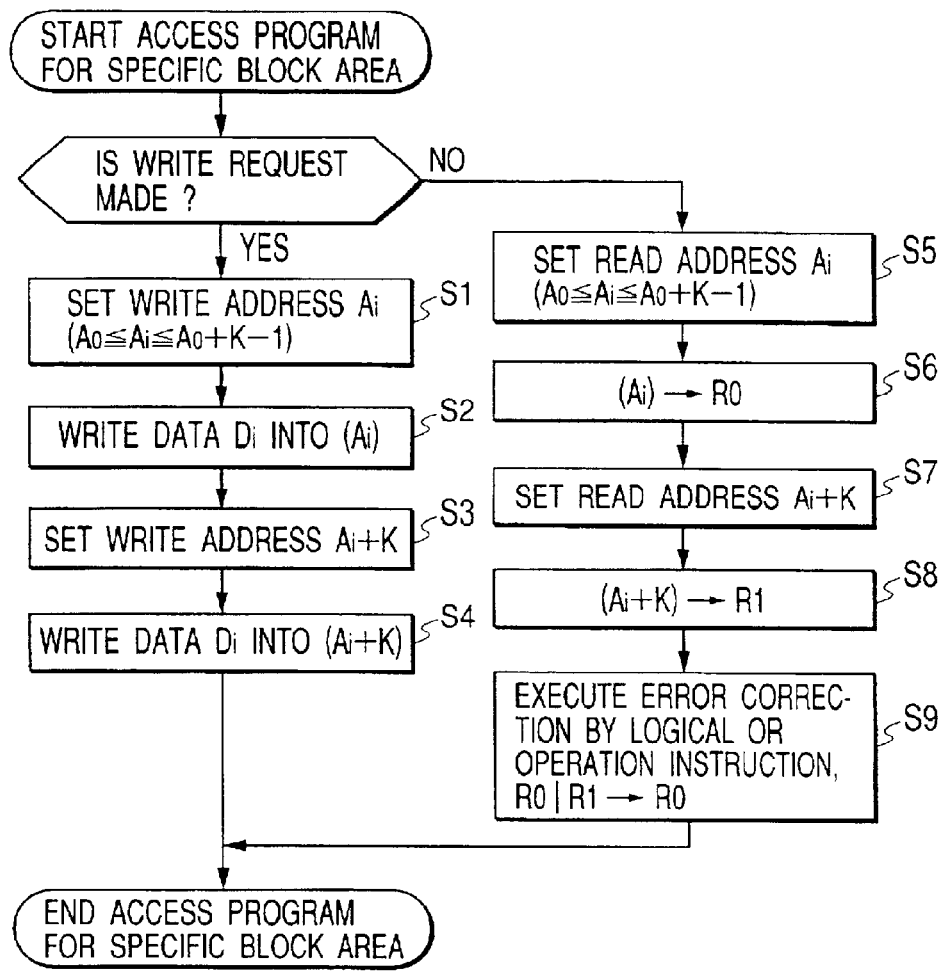
FIG. 35 is a flowchart illustrating by an example, a processing flow for a necessary error correction (logical OR operation), based on overlapping writing of one data into another address, and overlapped data read from the corresponding separate addresses.

FIG. 35 illustrates a processing flow for overlapping writing of one data into other addresses and a necessary error correction based on overlapped or duplicate data read from corresponding other addresses. A control principal part of this processing flow is a CPU 3. In short, the process for the overlapping writing of one data into other addresses and the necessary error correction based on the duplicate or overlapped data read from the corresponding other addresses is defined by an operation program of the CPU 3. This program might be offered from the manufacturer of the microcomputer to users, or a chip user might create it.

An access program for a specific block area 11, which is to be executed by the CPU 3, is roughly divided into one for controlling a data write operation and one for controlling a data read operation. According to such a description, the CPU 3 executes Steps S1 through S4 upon the data writing, whereas it executes Steps S5 through S9 upon the data reading.

Figure 36:
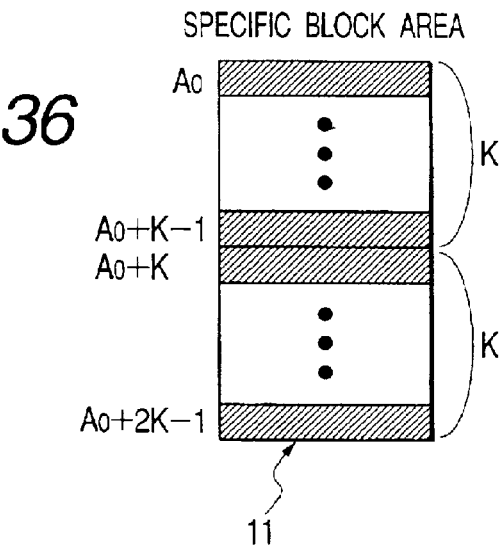
FIG. 36 is an explanatory diagram illustrating by way of example, a use form of a specific block area including 2K addresses from A0 to A0+2K−1.

A description will be made of one data writing. Let's assume that 2K addresses from A0 to A0+2K−1 are included in a specific block area 11 as illustrated in FIG. 36 by way of example. When the writing of information into the specific block area 11 is performed, an address Ai ($A0 \leq Ai \leq A0+K-1$) is first set to an address register of the CPU 3 to specify an address to be written, and thereafter outputted to the internal address bus 6 (S1). The program bit P of the flash memory 2 is set via the internal data bus 7, and write data Di is outputted and written into its corresponding address Ai of the flash memory 2 (S2). The operations of the address set (S1) and the data writing (S2) per se become identical to the program and program verify operations under the normal operation. Next, the write address is shifted by K (set to Ai+K) and set to the address register of the CPU 3. The address is outputted to the internal address bus 6 (S3), and the same data Di as above is written into an address Ai+K of the flash memory 2 (S4). The operations of the address set (S3) and data writing (S4) per se become identical to the program and program verify operations under the normal operation.

A description will be made of data reading. First of all, an address Ai ($A0 \leq Ai \leq A0+K-1$) of the flash memory, which is to be read out, is outputted to the bus 6 (S5). Data is loaded into a register (e.g., general-purpose register) R0 of the CPU 3 (S6). Next, an address (Ai+K) shifted by K is outputted to the bus 6 (S7), and data is loaded into a register (e.g., general-purpose register) R1 of the CPU 3 (S8). Let's now assume that the state of presence of an electrical charge in its corresponding floating gate of each flash memory cell and the state of absence thereof respectively correspond to logical values "1" and "0". Assuming that only a failure (failure of changing of the logical value "1" into the logical value "0") of disappearance of the electrical charge originally stored in the floating gate occurs and its reverse failure does not occurs, the CPU 3 executes an instruction for effecting a logical OR operation on the value of the register R0 and the value of the register R1 (S9). Thus, if the failure would occur in one data alone at most, then its error is corrected and hence the result of the logical OR operation becomes the original proper or correct value. Accordingly, the CPU 3 processes the result of such a logical OR operation as read data to thereby allow an improvement in the reliability of data frequently rewritten in the flash memory 2. Practically, the assured number of rewritings can be increased. In the example of FIG. 35, the data are written in double form, and the reading thereof is carried out by executing the logical OR operation of these. However, when data are written in triple or more form and a logical OR operation of these is performed to read the data, the use efficiency of each cell becomes worse but the reliability of the data is further enhanced.

When another block other than the specific block area 11 is accessed (the writing and reading of data therein and therefrom are carried out), a user obtains access to the above-described access program according to the normal method without starting up it. Thus, since no data is redundantly held in another block, the use efficiency of each cell is not degraded but the block cannot maintain the reliability of data, equivalent to the extent of the specific block area 11. The assured number of rewritings also becomes smaller than a value in the specific block area 11. If a user unrequiring the number of rewritings increased in particular at all blocks including the specific block area 11 does not start up the access program for the above-described specific block area even upon accessing to the specific block area 11, then the user can avoid degradation of the use efficiency of each of cells in all the blocks. The provision of an access program for performing the above-described multiple writing and logical OR operation at these plural blocks can cope with a user requiring the large number of rewritings even at other some blocks in addition to the specific block area 11. Thus, only the use/unuse of the program like the access program for the specific block area, or a change in its contents can cope with the needs of various users. It is not necessary to fully change a hardware configuration of the flash memory.

Incidentally, when the access program for the above-described specific block area is applied, the reading of data from the applied block (e.g., specific block area 11) needs a plurality of CPU instruction steps for each data. Therefore, the data cannot be randomly-accessed sequentially without a wait cycle. As a suitable application example of the present invention, there is considered such an application that data is written into the flash memory 2 from the RAM 4 before the turning off of the source or power for the system, and the data is read into the RAM 4 from the flash memory 2 immediately after power-on. For instance, applications are considered which include the storage of learned values and a self-diagnosed result of each in-vehicle part in the flash memory 2 in an electronic control unit for automobile use, the storage of favorite set values specified during the use of an air conditioner system by a user in the flash memory 2 in the air conditioner system, the storage of data in the flash memory 2 in a video game machine, etc.

Figure 37:
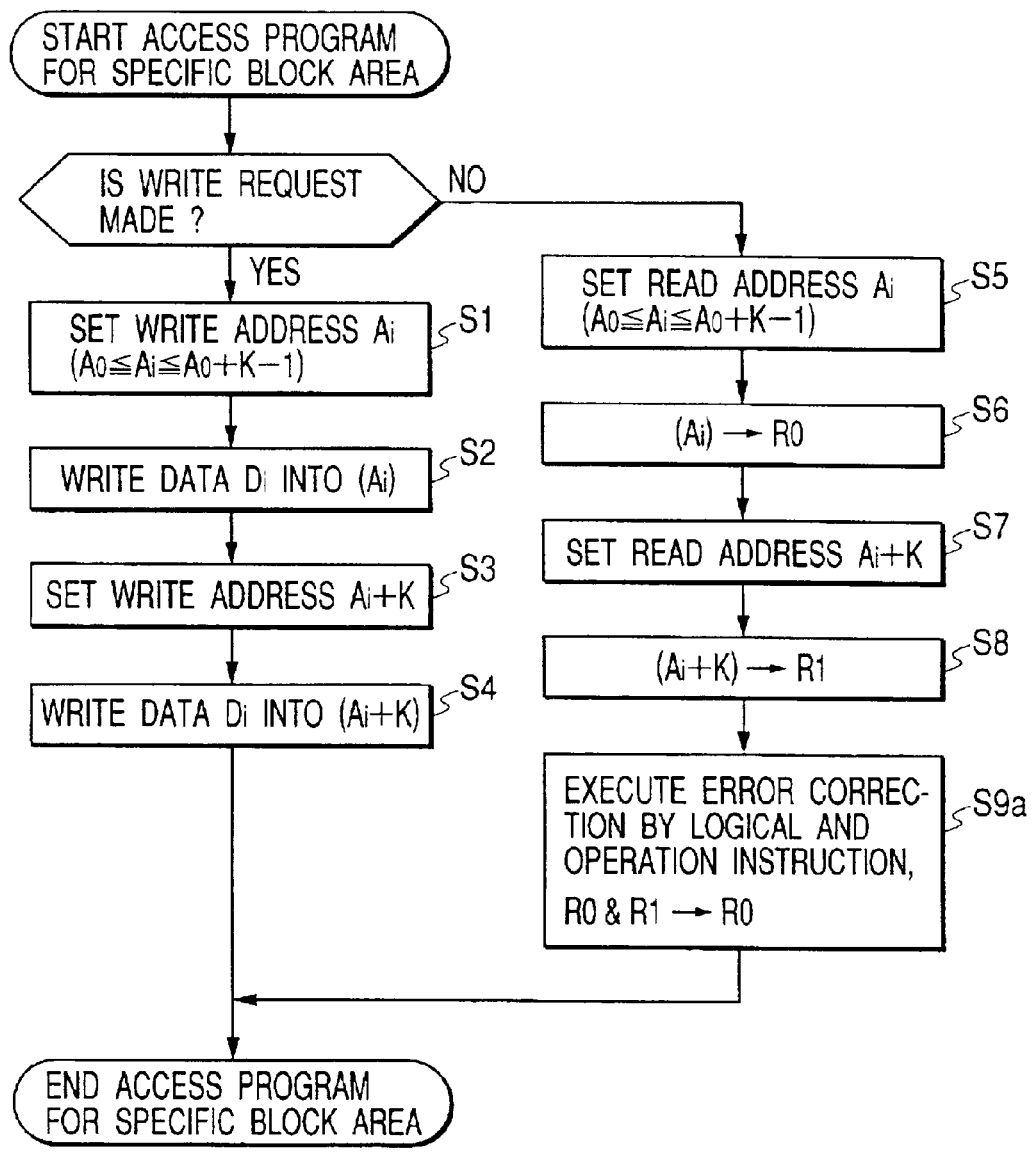
FIG. 37 is a flowchart illustrating by way of example, a processing flow for a necessary error correction (logical AND operation), based on overlapping writing of one data into another address, and overlapped data read from the corresponding separate addresses.

FIG. 37 illustrates by an example, a processing flow for overlapping writing of one data into other addresses and a necessary error correction based on overlapped or duplicate data read from corresponding other addresses when a failure produced in the flash memory is assumed to be contrary to FIG. 35. Contrary to FIG. 35, the present example is an example of an access program for a specific block area, which is executed upon coping with a failure of changing of a logical value "0" into a logical value "1". FIG. 37 is different from FIG. 35 in that Step S9 is changed to Step S9a. In Step S9a, a logical AND operation instruction is executed upon reading. Even in this case, if the failure would occur in one data alone at most, then its error is corrected and hence the result of the logical AND operation becomes the original proper or correct value. Accordingly, the CPU 3 processes the result of such a logical AND operation as read data to thereby allow an improvement in the reliability of data frequently rewritten in the flash memory 2. Practically, the assured number of rewritings can be increased. In the example of FIG. 37, the data are written in double form, and the reading thereof is carried out by executing the logical AND operation of these. However, when data are written in triple or more form and a logical AND operation of these is performed to read the data, the use efficiency of each cell becomes worse but the reliability of the data is further enhanced.

Figure 38:
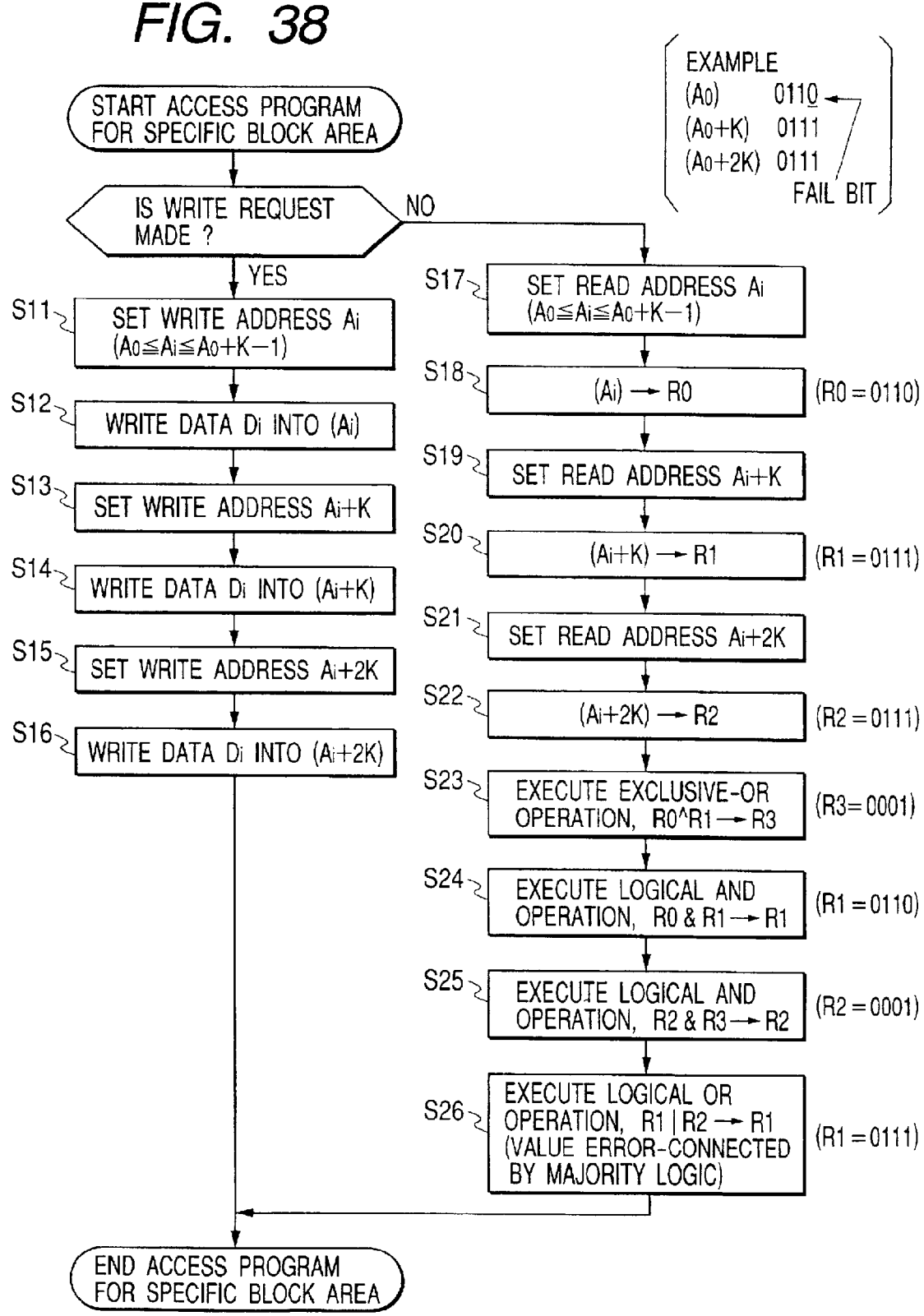
FIG. 38 is a flowchart illustrating a write and read control flow based on an access program in which the same data is written into three addresses (Ai, Ai+K and Ai+2K) and outputted by majority logic of these upon reading.

FIG. 38 illustrates, as an example, a write and read control flow based on an access program for writing the same data into three addresses (Ai, Ai+K and Ai+2K) upon writing, and taking majority logic of these upon reading and outputting the result thereof.

An access program for a specific block area, which is to be executed by the CPU 3, is roughly divided into one for controlling a data write operation and one for controlling a data read operation. According to such a description, the CPU 3 executes Steps S11 through S16 upon the data writing, whereas it executes Steps S17 through S26 upon the data reading.

Figure 39:
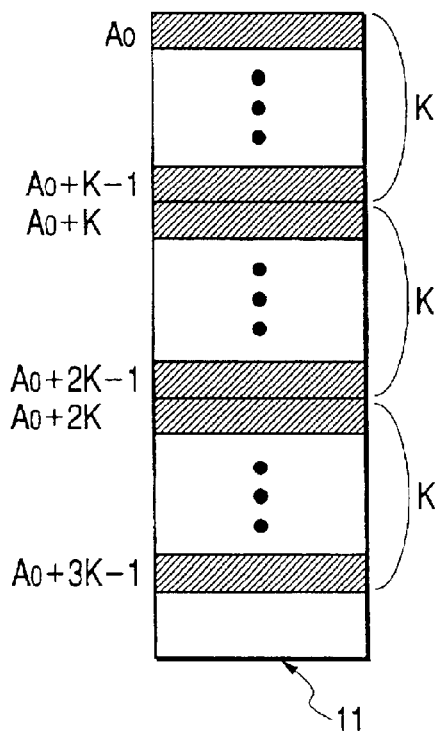
FIG. 39 is an explanatory diagram illustrating by an example, a use form of a specific block area 11 including 3K addresses from A0 to A0+3K−1.

A description will be made of one data writing. Let's assume that 3K addresses from A0 to A0+3K−1 are included in a specific block area 11 as illustrated in FIG. 39 by way of example. When the writing of information into the specific block area 11 is performed, an address Ai ($A0 \leq Ai \leq A0+K-1$) is first set to an address register of the CPU 3 to specify an address to be written, and then outputted to the address bus 6 (S11). The program bit P of the flash memory is set via the internal data bus 7, and write data Di is outputted and written into its corresponding address Ai of the flash memory 2 (S12). The operations of the address set (S11) and the data writing (S12) per se become identical to the program and program verify operations under the normal operation. Next, the write address is shifted by K (set to Ai+K) and set to the address register of the CPU 3. The address is outputted to the internal address bus 6 (S13), and the same data Di as above is written into an address Ai+K of the flash memory (S14). The operations of the address set (S13) and data writing (S14) per se become identical to the program and program verify operations under the normal operation. Further, the write address is shifted by 2K and set to (set to Ai+2K) to the address register of the CPU 3, followed by output to the address bus 6 (S15). The same data Di as above is written into the address Ai+2K of the flash memory (S16). The operations of the address set (S15) and data writing (S16) per se become identical to the program and program verify operations under the normal operation.

A description will be made of data reading. First of all, an address Ai ($A0 \leq Ai \leq A0+K-1$) of the flash memory, which is to be read out, is outputted to the bus 6 (S17). Data is loaded into a register (e.g., general-purpose register) R0 of the CPU 3 (S18). For instance, R0=0110 is loaded therein. Next, an address (Ai+K) shifted by K is outputted to the bus 6 (S19), and data is loaded into a register (e.g., general-purpose register) R1 of the CPU 3 (S20). For instance, R1=0111 is loaded therein. Further, an address (Ai+2K) shifted by 2K is outputted to the bus 6 (S21), and data is loaded into a register (e.g., general-purpose register) R2 of the CPU 3 (S22). For instance, R2=0111 is loaded therein.

Here, majority logic of three values (P, Q, R) is generally represented by $(P \cdot /Q + /P \cdot Q) \cdot R + P \cdot Q$. Symbol/means the inverse of a value added with it. In Steps S23 through S25, their operations or computations are executed according to combinations of logical operation instructions included in an instruction set of a normally-used microcomputer. In Step S23, the data of the register R0 and the data of the register R1 are exclusive-ORed and the result of exclusive ORing thereof is obtained at a register R3. In Step S24, the data of the register R0 and the data of the register R1 are ANDed and the result of ANDing thereof is stored in the register R1. In Step S25, the data of the register R2 and the data of the register R3 are ANDed and the result of ANDing thereof is stored in the register R2. In Step S26, the logical OR operation or computation of the R1 and R2 is carried out and the result thereof is stored in the R1. The result of the computation obtained at the register R1 in Step S26 is assumed to be the two data coincident with each other, of the three data. Accordingly, the CPU 3 processes the result of such a majority logic operation as read data to thereby make it possible to enhance the reliability of frequently-rewritten data. While there is the demerit of degrading the use efficiency of each memory cell and increasing the number of instruction steps as compared with the examples shown in FIGS. 35 and 37 in particular, there is a merit in that the present example can cope with both of a failure of changing of a logical value "1" into a logical value "0" and a failure of changing of the same "0" into "1".

Figure 40:
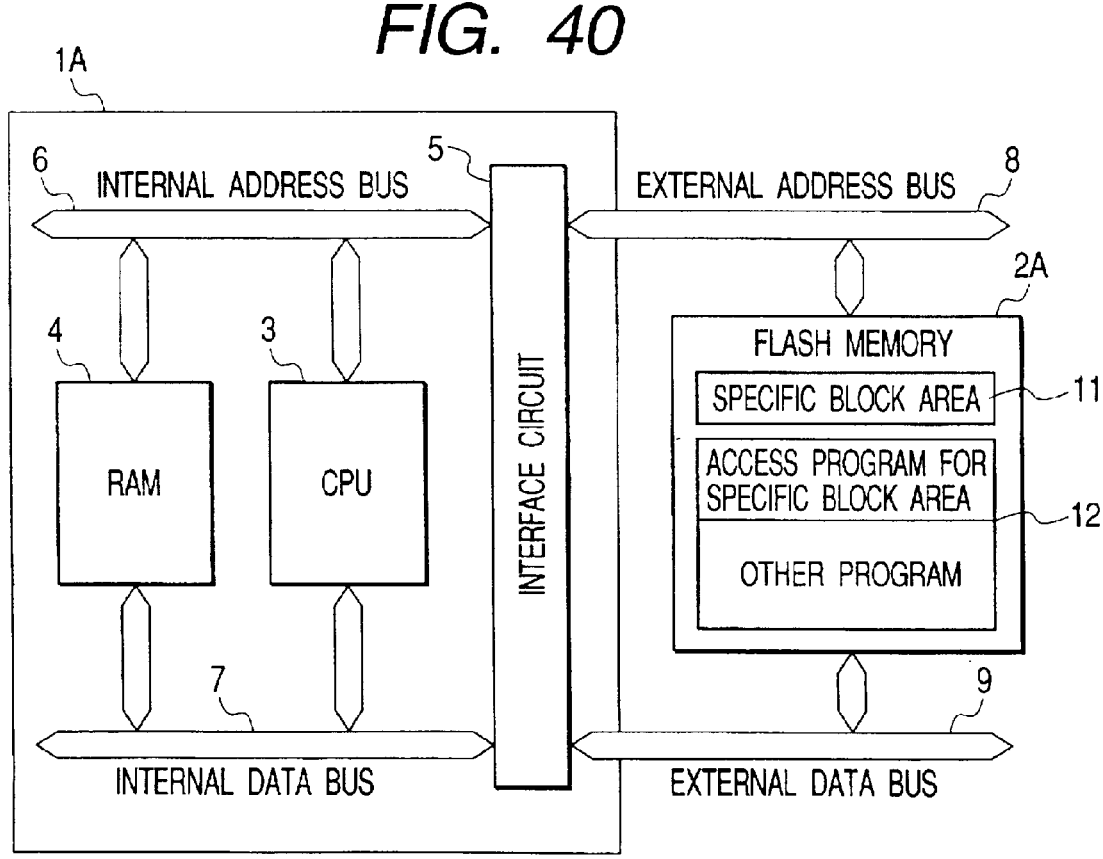
FIG. 40 is a block diagram illustrating a data processing system using an off-chip flash memory.

FIG. 40 shows an example of a data processing system using an off-chip type flash memory. In FIG. 40, a microcomputer 1A and a flash memory 2A are respectively formed on discrete chips. The flash memory 2 is not on-chip implemented in the microcomputer 1A, and the flash memory 2A is independently brought into semiconductor integrated circuit form. Even in the case of a configuration shown in FIG. 40, the flash memory 2A has the specific block area 11. Writing and reading for the specific block area 11 are controlled by a program executed by a CPU 3 of the microcomputer 1A in the same manner as described above. Even in the present multi-chip configuration, a substantial restriction imposed on the number of rewritings in a frequently-rewritten specific block area corresponding to part of the flash memory 2A can be relaxed, and the reliability of frequently-rewritten data can be enhanced.

While the invention made above by the present inventors has been described specifically by the illustrated embodiment, the present invention is by no means limited to it. It is needless to say that various changes can be made thereto within the scope not departing from the substance thereof.

For example, the writing or programming and reading are relative species and may be defined contrary to the above. A method of injecting electrons in a floating gate of a flash memory is not limited to hot-electron injection but may be tunnel injection. Further, a non-volatile memory is not limited to a configuration wherein data is held in binary form per memory cell. It may take a configuration in which data storage is carried out in the form of a multivalue such as four values. The non-volatile memory is not limited to the flash memory and may adopt a rewritable configuration having another storage or memory format, such as a ferroelectric memory or the like. A flash memory cell transistor may be a p channel type.

Further, how to delimit specific block areas is not limited to the method of holding K offsets and separating them from one another as illustrated in FIGS. 6 and 9 by way of example. It is also theoretically possible to sequentially set areas for writing one data as addresses adjacent to one another. The method of holding the K offsets and separating the block areas from one another makes it easy to create a program as well as to grasp data.

A circuit module provided with a data processing system is not limited to a RAM and an interface circuit. It may be a ROM, a compressor, an accelerator, other peripheral circuit, or the like.

Advantageous effects obtained by a typical one of the inventions disclosed in the second embodiment will be explained in brief as follows:

A partial area in which rewriting is frequently effected on a single non-volatile memory, is defined as a specific block. Upon writing made to the specific block, overlapping writing of one data into other addresses is carried out. Upon its reading, an error correction based on duplicate or overlapped data read from the corresponding other addresses is performed, and both processes referred to above are realized by a program of a CPU. Therefore, priority can be given to the suppression of degradation in the reliability of the storage of information in a partial storage area of the non-volatile memory. In an area in which the number of rewritings may be small, priority can be placed on the fact that the area is not intended for processing as the specific block to thereby maximize the use efficiency of each memory cell. Thus, one non-volatile memory can cope with applications ranging from an application in which the number of rewritings is low or small to an application in which the number of rewritings is great, and new hardware is not necessary to enhance the reliability of the storage of information or increase the upper-limited number of rewritings.

If either one of a logical OR operation and a logical AND operation is used for a logical operation executed by the CPU, then it can cope with only either a failure in stored information of "1" to "0" or a failure in stored information of "0" to "1". However, the use efficiency of each memory cell may simply be reduced to half than usual. The adoption of majority logic for logical operation can cope with both of the failure of "1" to "0" and the failure of "0" to "1".

What is claimed is:

1. A data processing system comprising:
an erasable and programmable non-volatile memory; and
a central processing unit,
wherein in a first write operation for writing first data into a first area of said memory, the central processing unit writes the first data to a first portion of said first area,
wherein in a second write operation for writing second data into a second area of said memory, the central processing unit writes the second data to a portion of said second area, and
wherein the central processing unit writes supplemental information relating to the first data into a second portion of said first area in said first write operation, but does not write such supplemental information relating to the second data in said second write operation.

2. The data processing system according to claim 1, which is a single chip type microcomputer wherein said memory and the central processing unit are formed on a single semiconductor chip.

3. The data processing system according to claim 2, wherein the central processing unit has means for holding information indicative of the occurrence of an error uncorrectable in the error determining process under the execution of the error-correcting program, recognizably from the outside.

4. The data processing system according to claim 1, which is configured in a multi-chip form wherein said memory and the central processing unit are respectively formed on discrete semiconductor chips.

5. The data processing system according to claim 1, wherein the first write operation comprises an error-correcting information generating operation for generating error correcting information for the data written into the first area of the non-volatile memory, and
wherein a read operation includes an error-correcting operation for effecting an error decision and an error correction on data with error correcting information read from the first area.

6. The data processing system according to claim 5, which has a storage area for a matrix table wherein when the data is configured as n bits and error correcting information for the n-bit data is defined as m bits, mutually-different binary numbers of m bits are arranged in an m+n array, and wherein the matrix table is referred to the error-correcting information generating operation and the error-correcting operation.

7. The data processing system according to claim 5, further including a mask ROM accessible by the central processing unit, and wherein the mask ROM has the error-correcting information generating operation and the error-correcting operation.

8. The data processing system according to claim 5, wherein the other storage areas of the non-volatile memory have areas for storing the error-correcting information generating operation and the error-correcting operation.

9. The data processing system according to claim 8, wherein the other storage areas of the non-volatile memory have an erase prohibition area in which an erase operation is prohibited, and a rewrite allowable area in which erasing and writing are allowed, and the areas for storing the error-correcting information generating operation and the error-correcting operation are assigned to the erase prohibition area.

10. The data processing system according to claim 9, wherein the error-correcting information generating operation serves so as to generate error correcting information and thereafter store the generated error correcting information and data corresponding thereto in the first memory area in accordance with a prescribed format as data with the error correcting information, and the error-correcting operation serves so as to recognize the data with the error correcting information in accordance with the prescribed format.

11. The data processing system according to claim 8, wherein the other storage areas of the non-volatile memory have an erase prohibition area in which an erase operation is prohibited, and a rewrite allowable area in which erasing and writing are allowed, and wherein the areas for storing the error-correcting information generating operation and the error-correcting operation are assigned to the rewrite allowable area.

12. The data processing system according to claim 5, further including a RAM to which the error-correcting generating operation and the error-correcting operation are transferred from the non-volatile memory, and wherein the central processing unit executes the error-correcting information generating operation and the error-correcting operation transferred to the RAM.

13. The data processing system according to claim 12, wherein the central processing unit transfers the error-correcting information generating operation and the error-correcting operation from the non-volatile memory to the RAM in response to reset instructions.

14. The data processing system according to claim 5, further including a RAM accessible by the central processing unit, and wherein the central processing unit successively reads data with error correcting information from the first memory area of the non-volatile memory in response to reset instructions, effects the error decision and error correction on the read data with error correcting information according to the execution of the error-correcting operation, and initially stores the data subjected to the error decision and correction in the RAM.

15. A data processing system comprising:
an erasable and programmable non-volatile memory; and
a central processing unit;
wherein the central processing unit executes a predetermined process to thereby generate error correcting information and add the same to data to be written only for a specified partial storage area of the non-volatile memory and allow an error decision and an error correction based on the error correcting information to be effected on the data read from the specified partial storage area.

16. The data processing system according to claim 15, which is a single chip type microcomputer wherein said memory and the central processing unit are formed on a single semiconductor chip.

17. The data processing system according to claim 15, which is configured in a multi-chip form wherein said memory and the central processing unit are respectively formed on discrete semiconductor chips.

18. The data processing system according to claim 15, wherein the predetermined process comprises an error-correcting information generating program for generating error correcting information for the data written into the specified partial storage area of the non-volatile memory, and an error-correcting program for effecting an error decision and an error correction on data with error correcting information read from the specified partial storage area.

19. The data processing system according to claim 15, which has a storage area for a matrix table wherein when the data is configured as n bits and error correcting information for the n-bit data is defined as m bits, mutually-different binary numbers of m bits are arranged in an m+n array, and wherein the matrix table is referred to the error-correcting information generating program and the error-correcting program.

20. The data processing system according to claim 18, further including a mask ROM accessible by the central processing unit, and wherein the mask ROM has the error-correcting information generating program and the error-correcting program.

21. The data processing system according to claim 20, wherein the central processing unit has a storage circuit for holding, when error-correctable data is detected during the execution of the error-correcting program, information corresponding to the result of detection.

22. The data processing system according to claim 21, wherein the information corresponding to the result of detection is used as warning information.

23. The data processing system according to claim 18, wherein the other storage areas of the non-volatile memory have areas for storing the error-correcting information generating program and the error-correcting program.

24. The data processing system according to claim 23, wherein the other storage areas of the non-volatile memory have an erase prohibition area in which an erase operation is prohibited, and a rewrite allowable area in which erasing and writing are allowed, and the areas for storing the error-correcting information generating program and the error-correcting program are assigned to the erase prohibition area.

25. The data processing system according to claim 24, wherein the error-correcting information generating program serves so as to generate error correcting information and thereafter store the generated error correcting information and data corresponding thereto in the specified partial storage area in accordance with a prescribed format as data with the error correcting information, and the error-correcting program serves so as to recognize the data with the error correcting information in accordance with the prescribed format.

26. The data processing system according to claim 23, wherein the other storage areas of the non-volatile memory have an erase prohibition area in which an erase operation is prohibited, and a rewrite allowable area in which erasing and writing are allowed, and
wherein the areas for storing the error-correcting information generating program and the error-correcting program are assigned to the rewrite allowable area.

27. The data processing system according to claim 18, further including a RAM to which the error-correcting generating program and the error-correcting program are transferred from the non-volatile memory, and wherein the central processing unit executes the error-correcting information generating program and the error-correcting program transferred to the RAM.

28. The data processing system according to claim 27, wherein the central processing unit transfers the error-correcting information generating program and the error-correcting program from the non-volatile memory to the RAM in response to reset instructions.

29. The data processing system according to claim 18, further including a RAM accessible by the central processing unit, and wherein the central processing unit successively reads data with error correcting information from the partial storage area of the non-volatile memory in response to reset instructions, effects the error decision and error correction on the read data with error correcting information according to the execution of the error-correcting program, and initially stores the data subjected to the error decision and correction in the RAM.

30. The data processing system according to claim 18, wherein the central processing unit has means for holding information indicative of the occurrence of an error uncorrectable in the error determining process under the execution of the error-correcting program, recognizably from the outside.

31. A data processing system comprising:
a first storage area which is structured to allow for a relatively low number of rewrite assurances; and
a second storage area which is structured to allow for a relatively high number of rewrite assurances,
wherein both of said first storage area and second storage area are allocated in an address space of an arithmetic control device,
wherein the first storage area comprises programs which include an ECC code generating program for generating each of ECC codes for data to be written in the second storage area, and an error-correcting program for effecting an error decision and an error correction on data with the ECC codes read from the second storage area,
wherein said second storage area stores data and the ECC code for the data, and
wherein the arithmetic control device executes the ECC code generating program when data is stored in the second storage area.

32. The data processing system according to claim 31, wherein the arithmetic control device executes the error-correcting program when corresponding data is read from the second storage area.

33. The data processing system according to claim 31, wherein the arithmetic control device executes the error-correcting program in response to a predetermined operation mode and sequentially transfers the data of the second storage area to RAM.

34. The data processing system according to claim 31, wherein the first storage area is arranged in a memory array that is different from the second storage area.

35. The data processing system according to claim 31, wherein each of the first storage area and the second storage area is an electrically erasable and programmable flash memory, the flash memory has a write/erase program for the flash memory, and further including a RAM to which the write/erase program is transferred from the flash memory, and wherein the arithmetic control device is capable of executing the write/erase program placed on the RAM in response to a specific operation mode.

36. The data processing system according to claim 31,
wherein the ECC code generating program uses a matrix table wherein when ECC codes are defined as m bits with respect to data of n bits, mutually-different binary numbers of m bits are arranged in an m+n array, and
wherein the ECC code generating program performs the following operations:
exclusive-ORing values in columns of the matrix table, corresponding to bit positions of logical values "1" of data bits as viewed in a row direction upon generating the ECC codes;
setting the values of m bits obtained from the exclusive-ORing as the ECC codes; and
adding the ECC codes to data respectively to thereby generate code words of m+n bits.

37. The data processing system according to claim 36, further having the following operations:
exclusive-ORing values in columns of the matrix table, corresponding to bit positions of logical values "1" of the code words as viewed in the row direction, making an error-free decision when the values of m bits obtained by the exclusive-ORing are of a logical value "0" in all bits to thereby set the n-bit data of the code words as normal data, determining that an error exists when the values of m bits obtained by the exclusive-ORing are of a logical value "1" for at least one bit, retrieving a column coincident with a binary number of m bits obtained by the exclusive-ORing from the columns of the matrix table, inverting bits of code words at positions associated with the retrieved column in logical value and correcting the same, and defining the n-bit data of the corrected code words as normal data.

38. A semiconductor integrated circuit comprising:
a CPU; and
an erasable and programmable non-volatile memory,
wherein said memory comprises a plurality of memory areas each of which has a plurality of memory cells,
wherein the CPU stores data in memory cells at different addresses in a first memory area when information is written in said first memory area of the non-volatile memory,
wherein the CPU stores second data to memory cells at different addresses in a second memory area of the non-volatile memory when information is written in said second memory area of the non-volatile memory, and
wherein for the first memory area, but not the second memory area, the CPU reads data from the memory cells at the different addresses, and performs a logical operation on the read plural data to thereby effect a necessary error correction to the data.

39. The semiconductor integrated circuit according to claim 38, wherein the number of the different addresses is two or more, and the logical operation is a logical OR operation based on the execution of an instruction included in an instruction set of the CPU.

40. The semiconductor integrated circuit according to claim 38, wherein the number of the different addresses is two or more, and the logical operation is a logical AND operation based on the execution of an instruction included in an instruction set of the CPU.

41. The semiconductor integrated circuit according to claim 38, wherein the number of the different addresses is three or more, and the logical operation is an operation for effecting majority decision on the plural data read from the memory cells at the different addresses.

42. The semiconductor integrated circuit according to claim 38, wherein the non-volatile memory has a program area for storing a program executed by the CPU, as an area different from the first memory area.

43. The semiconductor integrated circuit according to claim 42, wherein the program area includes a program for storing the one data in the memory cells at the different addresses, a program for performing the error correction, and other programs.

44. The semiconductor integrated circuit according to claim 38, wherein the first memory area has a product specification for assuring the number of rewritings greater than other blocks.

45. The semiconductor integrated circuit according to claim 38, wherein the non-volatile memory is a flash memory that stores information therein according to high and low levels of a threshold voltage of each memory cell.

46. The semiconductor integrated circuit according to claim 38, wherein the CPU and the non-volatile memory are formed on a single semiconductor chip which constitutes a microcomputer.

47. The semiconductor integrated circuit according to claim 38, wherein the CPU and the non-volatile memory are respectively formed on separate semiconductor chips.

* * * * *